(12) United States Patent
Wilson et al.

(10) Patent No.: US 10,392,913 B2
(45) Date of Patent: Aug. 27, 2019

(54) TREATMENT BASED ON FIBER CABLE SENSOR DATA

(71) Applicant: Schlumberger Technology Corporation, Sugar Land, TX (US)

(72) Inventors: Colin Allan Wilson, Sugar Land, TX (US); Joel Herve Le Calvez, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 283 days.

(21) Appl. No.: 15/289,628

(22) Filed: Oct. 10, 2016

(65) Prior Publication Data
US 2018/0100388 A1  Apr. 12, 2018

(51) Int. Cl.
*E21B 43/26* (2006.01)
*G01H 9/00* (2006.01)
*E21B 47/12* (2012.01)

(52) U.S. Cl.
CPC .......... *E21B 43/26* (2013.01); *E21B 47/123* (2013.01); *G01H 9/004* (2013.01)

(58) Field of Classification Search
CPC ........ E21B 43/26; E21B 47/123; G01H 9/004
See application file for complete search history.

(56) References Cited

U.S. PATENT DOCUMENTS

2010/0207019 A1* 8/2010 Hartog ................. E21B 47/101
                                                              250/269.1
2017/0342814 A1* 11/2017 Krueger ................. E21B 43/17

OTHER PUBLICATIONS

Smart Fibers Ltd, Technology Overview of Permanent Downhole Distributed Pressure Sensing with Fiber Bragg Grating Sensing Technology, Jul. 26, 2016 (46 pages).
Blackburn et al., Borehole Seismic Surveys: Beyond the Vertical Profile, Oilfield Review, Autumn 2007, pp. 20-35 (16 pages).
Bennet et al., The Source for Hydraulic Fracture Characterization, Oilfield Review, Winter 2005/2006, pp. 42-57 (16 pages).

* cited by examiner

*Primary Examiner* — Caroline N Butcher
(74) *Attorney, Agent, or Firm* — Mitchell M. Blakely

(57) ABSTRACT

A method can include, during a treatment process, receiving vibration data acquired over a length of a fiber cable sensor disposed in a well that includes perforations; filtering the vibration data as to traveling waves to generate filtered data; analyzing the filtered data to generate fluid flow information; and adjusting the treatment process based at least in part on the fluid flow information.

20 Claims, 12 Drawing Sheets

Zero-Offset VSP 301

Deviated Well VSP 302

Offset VSP 303

Walkaway VSP 304

TREATMENT BASED ON FIBER CABLE SENSOR DATA

BACKGROUND

Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Various techniques described herein pertain to processing of data such as, for example, seismic data.

SUMMARY

A method can include, during a treatment process, receiving vibration data acquired over a length of a fiber cable sensor disposed in a well that includes perforations; filtering the vibration data as to traveling waves to generate filtered data; analyzing the filtered data to generate fluid flow information; and adjusting the treatment process based at least in part on the fluid flow information. A system can include a processor; memory accessible by the processor; processor-executable instructions stored in the memory that include instructions to instruct the system to: during a treatment process, receive vibration data acquired over a length of a fiber cable sensor disposed in a well that includes perforations; filter the vibration data as to traveling waves to generate filtered data; analyze the filtered data to generate fluid flow information; and adjust the treatment process based at least in part on the fluid flow information. One or more computer-readable storage media can include computer-executable instructions to instruct a system to: during a treatment process, receive vibration data acquired over a length of a fiber cable sensor disposed in a well that includes perforations; filter the vibration data as to traveling waves to generate filtered data; analyze the filtered data to generate fluid flow information; and adjust the treatment process based at least in part on the fluid flow information.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than 1 Hz and/or optionally more than 100 Hz). Seismic data may be processed and interpreted, for example, to understand better composition, fluid content, extent and geometry of subsurface rocks.

Figure 1:
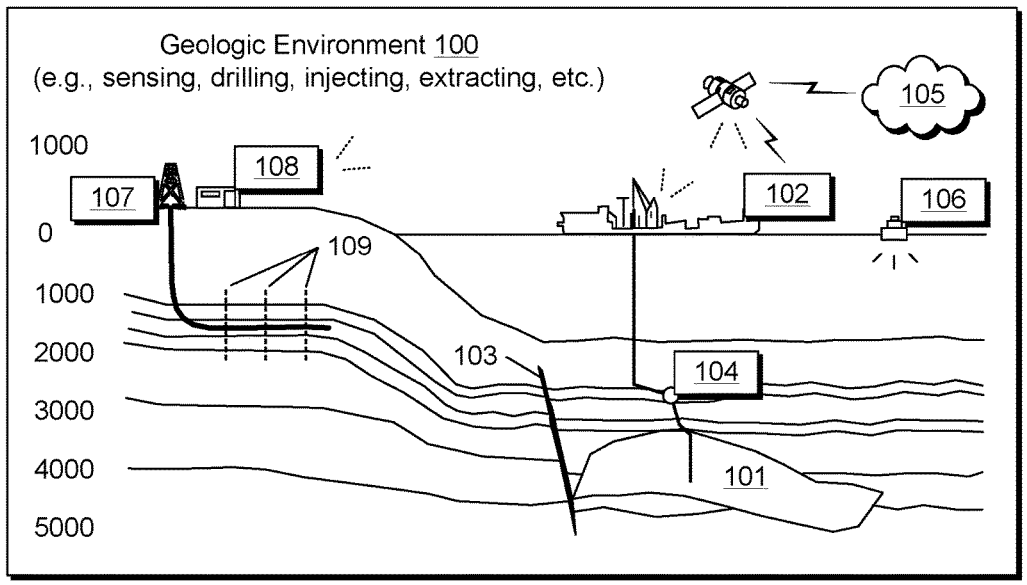
FIG. 1 illustrates an example of a geologic environment and an example of a technique.
Figure 1:
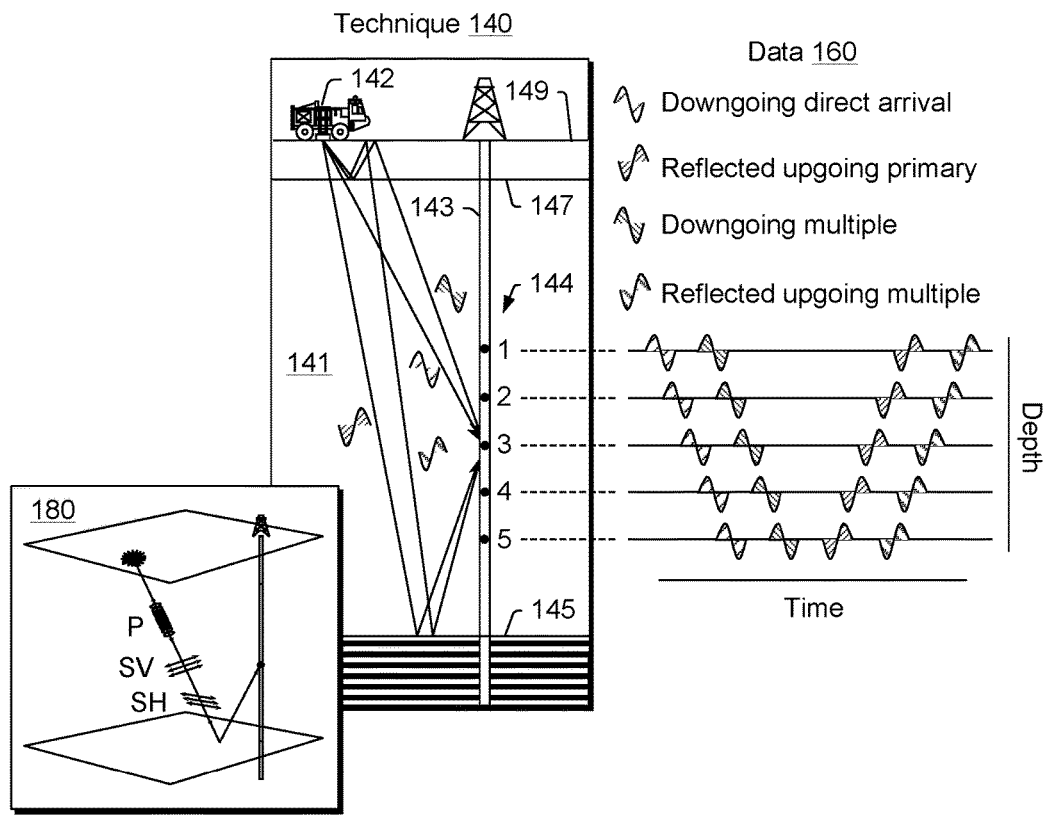

FIG. 1 shows an example of a geologic environment 100 (e.g., an environment that includes a sedimentary basin, a reservoir 101, a fault 103, one or more fractures 109, etc.) and an example of an acquisition technique 140 to acquire seismic data. As an example, a system may process data acquired by the technique 140, for example, to allow for direct or indirect management of sensing, drilling, injecting, extracting, etc., with respect to the geologic environment 100. In turn, further information about the geologic environment 100 may become available as feedback (e.g., optionally as input to the system). As an example, an operation may pertain to a reservoir that exists in the geologic environment 100 such as, for example, the reservoir 101. As an example, a technique may provide information (e.g., as an output) that may specifies one or more location coordinate of a feature in a geologic environment, one or more characteristics of a feature in a geologic environment, etc.

As an example, a system may include features of a commercially available simulation framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of interpretation, model-building, simulating a geologic environment, decision making, operational control, etc.).

As an example, a system may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.). In an example embodiment, various components may be implemented as add-ons (or plug-ins) that conform to and operate according to specifications of a framework environment (e.g., according to application programming interface (API) specifications, etc.).

In the example of FIG. 1, the geologic environment 100 may include layers (e.g., stratification) that include the reservoir 101 and that may be intersected by a fault 103 (see also, e.g., the one or more fractures 109, which may intersect a reservoir). As an example, a geologic environment may be or include an offshore geologic environment, a seabed geologic environment, an ocean bed geologic environment, etc.

As an example, the geologic environment 100 may be outfitted with any of a variety of sensors, detectors, actuators, etc. For example, equipment 102 may include communication circuitry to receive and to transmit information with respect to one or more networks 105. Such information may include information associated with downhole equipment 104, which may be equipment to acquire information, to assist with resource recovery, etc. Other equipment 106 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 105 that may be configured for communications, noting that the satellite may additionally or alternatively include circuitry for imagery (e.g., spatial, spectral, temporal, radiometric, etc.).

FIG. 1 also shows the geologic environment 100 as optionally including equipment 107 and 108 associated with a well that includes a substantially horizontal portion that may intersect with one or more of the one or more fractures 109. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 107 and/or 108 may include components, systems, etc. for fracturing, seismic sensing, analysis of seismic data, assessment of one or more fractures, etc.

As an example, a system may be used to perform one or more workflows. A workflow may be a process that includes a number of worksteps. A workstep may operate on data, for example, to create new data, to update existing data, etc. As an example, a system may operate on one or more inputs and create one or more results, for example, based on one or more algorithms. As an example, a system may include a workflow editor for creation, editing, executing, etc. of a workflow. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable instructions, etc.). As an example, a workflow may include rendering information to a display (e.g., a display device). As an example, a workflow may include receiving instructions to interact with rendered information, for example, to process information and optionally render processed information. As an example, a workflow may include transmitting information that may control, adjust, initiate, etc. one or more operations of equipment associated with a geologic environment (e.g., in the environment, above the environment, etc.).

In FIG. 1, the technique 140 may be implemented with respect to a geologic environment 141. As shown, an energy source (e.g., a transmitter) 142 can emit energy where the energy travels as waves that interact with the geologic environment 141. The geologic environment 141 may include a bore 143 where one or more sensors (e.g., receivers) 144 may be positioned in the bore 143. Energy emitted by the energy source 142 may interact with a layer (e.g., a structure, an interface, etc.) 145 in the geologic environment 141 such that a portion of the energy is reflected, which may then be sensed by one or more of the sensors 144. Such energy may be reflected as an upgoing primary wave (e.g., or "primary" or "singly" reflected wave). A portion of emitted energy may be reflected by more than one structure in the geologic environment and referred to as a multiple reflected wave (e.g., or "multiple"). For example, the geologic environment 141 is shown as including a layer 147 that resides below a surface layer 149. Given such an environment and arrangement of the source 142 and the one or more sensors 144, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces (see also, e.g., FIG. 2), evidence of a multiple from a water interface (e.g., an interface of a base of water and rock or sediment beneath it) or evidence of a multiple from an air-water interface, etc.

As shown in FIG. 1, acquired data 160 can include data associated with downgoing direct arrival waves, reflected upgoing primary waves, downgoing multiple reflected waves and reflected upgoing multiple reflected waves. The acquired data 160 is also shown along a time axis and a depth axis. As indicated, in a manner dependent at least in part on characteristics of media in the geologic environment 141, waves travel at velocities over distances such that relationships may exist between time and space. Thus, time information, as associated with sensed energy, may allow for understanding spatial relations of layers, interfaces, structures, etc. in a geologic environment.

FIG. 1 also shows various types of waves as including P, SV an SH waves. As an example, a P-wave can be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave can be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As to parameters that may characterize anisotropy of media (e.g., seismic anisotropy), consider one or more the Thomsen parameters $\varepsilon$, $\delta$ and $\gamma$. The Thomsen parameter $\delta$ describes depth mismatch between logs (e.g., actual depth) and seismic depth. As to the Thomsen parameter $\varepsilon$, it describes a difference between vertical and horizontal compressional waves (e.g., P or P-wave or quasi compressional wave qP or qP-wave). As to the Thomsen parameter $\gamma$, it describes a difference between horizontally polarized and vertically polarized shear waves (e.g., horizontal shear wave SH or SH-wave and vertical shear wave SV or SV-wave or quasi vertical shear wave qSV or qSV-wave). The Thomsen parameters $\varepsilon$ and $\gamma$ may be estimated from wave data while estimation of the Thomsen parameter $\delta$ may involve access to additional information.

As an example, seismic data may be acquired for a region in the form of traces. In the example of FIG. 1, the technique 140 may include the source 142 for emitting energy where portions of such energy (e.g., directly and/or reflected) may be received via the one or more sensors 144. As an example, energy received may be discretized by an analog-to-digital converter that operates at a sampling rate. For example, acquisition equipment may convert energy signals sensed by a sensor to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

Figure 2:
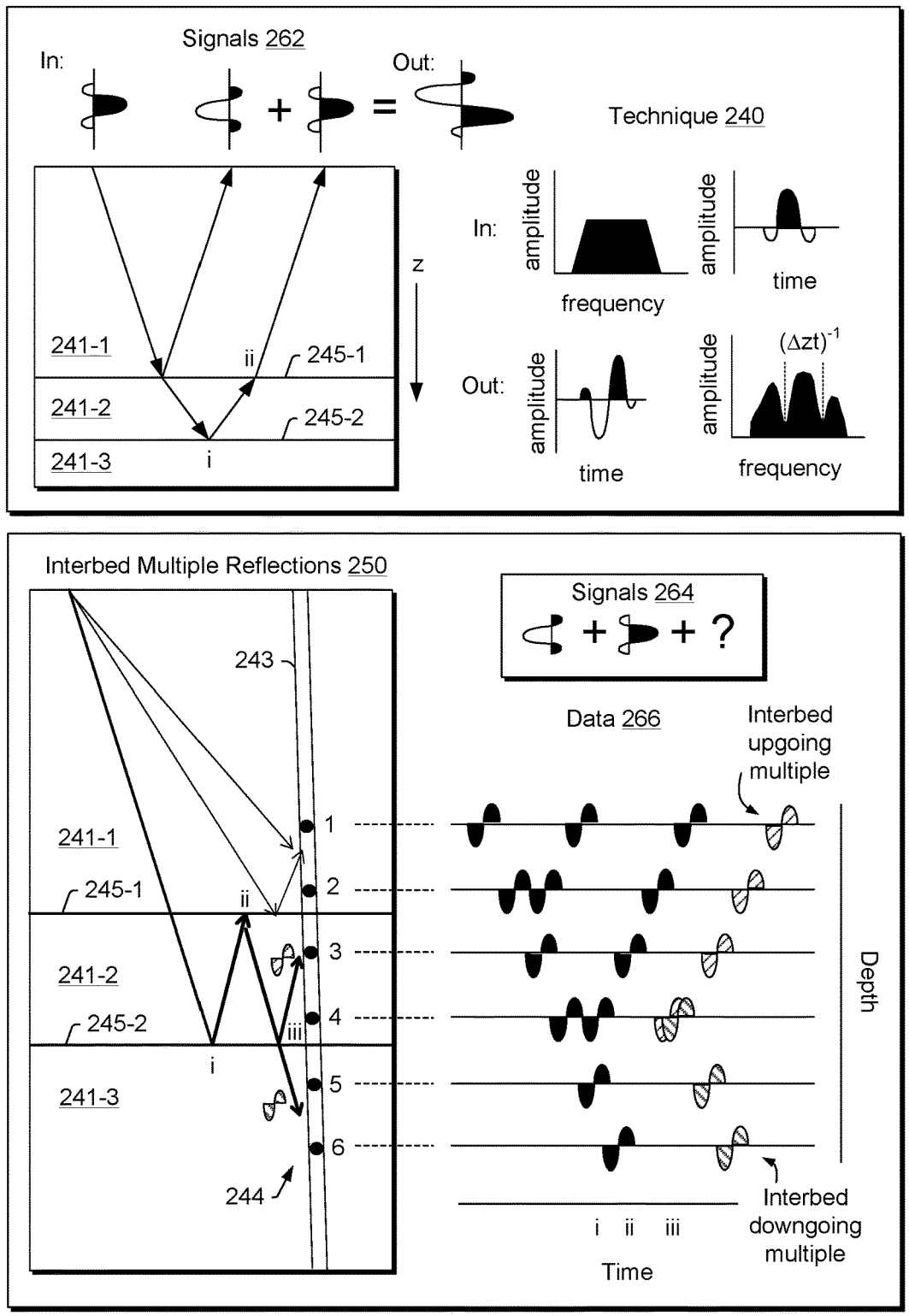
FIG. 2 illustrates examples of multiple reflections and examples of techniques.

FIG. 2 shows an example of a technique 240, examples of signals 262 associated with the technique 240, examples of interbed multiple reflections 250 and examples of signals 264 and data 266 associated with the interbed multiple reflections 250. As an example, the technique 240 may include emitting energy with respect to time where the energy may be represented in a frequency domain, for example, as a band of frequencies. In such an example, the emitted energy may be a wavelet and, for example, referred to as a source wavelet which has a corresponding frequency spectrum (e.g., per a Fourier transform of the wavelet).

As an example, a geologic environment may include layers 241-1, 241-2 and 241-3 where an interface 245-1 exists between the layers 241-1 and 241-2 and where an interface 245-2 exists between the layers 241-2 and 241-3. As illustrated in FIG. 2, a wavelet may be first transmitted downward in the layer 241-1; be, in part, reflected upward by the interface 245-1 and transmitted upward in the layer 241-1; be, in part, transmitted through the interface 245-1 and transmitted downward in the layer 241-2; be, in part, reflected upward by the interface 245-2 (see, e.g., "i") and transmitted upward in the layer 241-2; and be, in part, transmitted through the interface 245-1 (see, e.g., "ii") and again transmitted in the layer 241-1. In such an example, signals (see, e.g., the signals 262) may be received as a result of wavelet reflection from the interface 245-1 and as a result of wavelet reflection from the interface 245-2. These signals may be shifted in time and in polarity such that addition of these signals results in a waveform that may be analyzed to derive some information as to one or more characteristics of the layer 241-2 (e.g., and/or one or more of the interfaces 245-1 and 245-2). For example, a Fourier transform of signals may provide information in a frequency domain that can be used to estimate a temporal thickness (e.g., $\Delta zt$) of the layer 241-2 (e.g., as related to acoustic impedance, reflectivity, etc.).

As to the data 266, they illustrate further transmissions of emitted energy, including transmissions associated with the interbed multiple reflections 250. For example, while the technique 240 is illustrated with respect to interface related events i and ii, the data 266 further account for additional interface related events, denoted iii, that stem from the event ii. Specifically, as shown in FIG. 2, energy is reflected downward by the interface 245-1 where a portion of that energy is transmitted through the interface 245-2 as an interbed downgoing multiple and where another portion of that energy is reflected upward by the interface 245-2 as an interbed upgoing multiple. These portions of energy may be received by one or more receivers 244 (e.g., disposed in a well 243) as signals. These signals may be summed with other signals, for example, as explained with respect to the technique 240. For example, such interbed multiple signals may be received by one or more receivers over a period of time in a manner that acts to "sum" their amplitudes with amplitudes of other signals (see, e.g., illustration of signals 262 where interbed multiple signals are represented by a question mark "?"). In such an example, the additional interbed signals may interfere with an analysis that aims to determine one or more characteristics of the layer 241-2 (e.g., and/or one or more of the interfaces 245-1 and 245-2). For example, interbed multiple signals may interfere with identification of a layer, an interface, interfaces, etc. (e.g., consider an analysis that determines temporal thickness of a layer, etc.).

Figure 3:
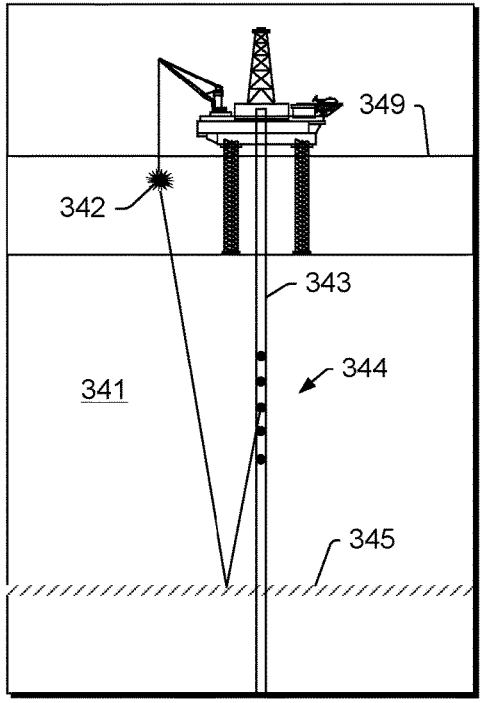
FIG. 3 illustrates examples of survey techniques.
Figure 3:
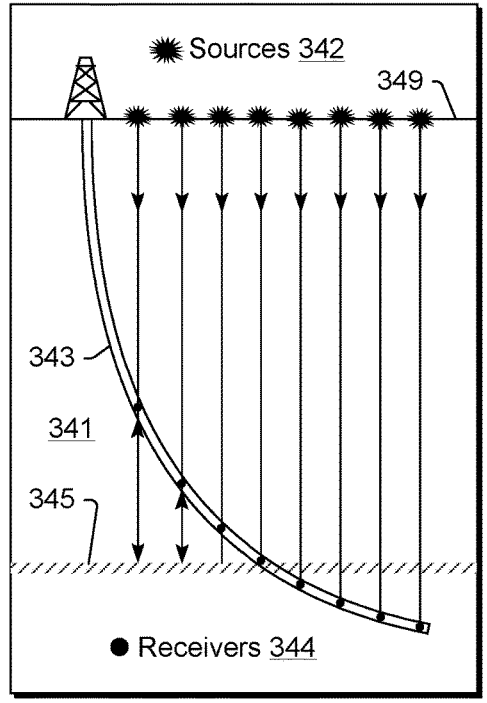
Figure 3:
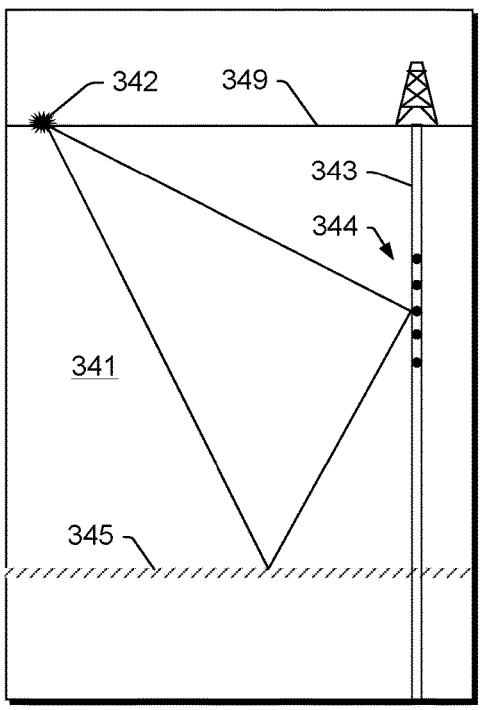
Figure 3:
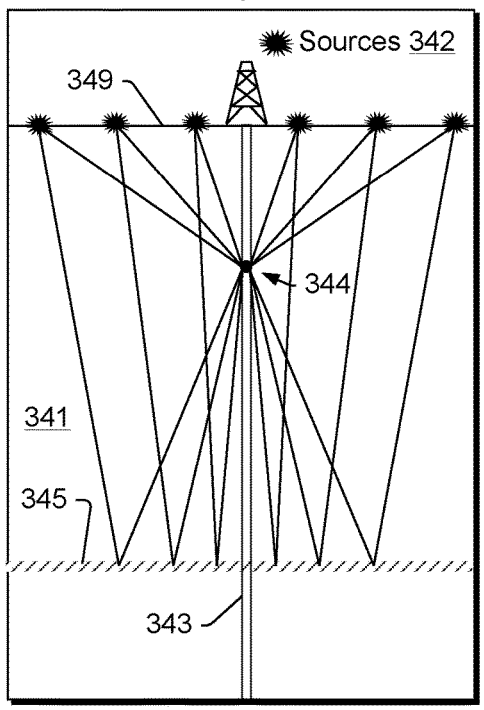

FIG. 3 shows some examples of data acquisition techniques or "surveys" that include a zero-offset vertical seismic profile (VSP) technique 301, a deviated well vertical seismic profile technique 302, an offset vertical seismic profile technique 303 and a walkaway vertical seismic profile technique 304. In each of the examples, a geologic environment 341 with a surface 349 is shown along with at least one energy source (e.g., a transmitter) 342 that may emit energy where the energy travels as waves that interact with the geologic environment 341. As an example, the geologic environment 341 may include a bore 343 where one or more sensors (e.g., receivers) 344 may be positioned in the bore 343. Energy emitted by the energy source 342 may interact with a layer (e.g., a structure, an interface, etc.) 345 in the geologic environment 341 such that a portion of the energy is reflected, which may then be sensed by at least one of the one or more of the sensors 344. Such energy may be reflected as an upgoing primary wave (e.g., or "primary" or "singly" reflected wave). A portion of emitted energy may be reflected by more than one structure in the geologic environment and referred to as a multiple reflected wave. As an example, a multiple reflected wave may be or include an interbed multiple reflected wave (see, e.g., interbed multiple reflections 250 of FIG. 2).

As to the example techniques 301, 302, 303 and 304, these are described briefly below, for example, with some comparisons. As to the technique 301, given the acquisition geometry, with no substantial offset between the source 342 and bore 343, a zero-offset VSP may be acquired. In such an example, seismic waves travel substantially vertically down to a reflector (e.g., the layer 345) and up to the receiver 344, which may be a receiver array. As to the technique 302, this may be another so-called normal-incidence or vertical-incidence technique where a VSP may be acquired in, for example, a deviated bore 243 with one or more of the source 342 positioned substantially vertically above individual receivers 344 (e.g., individual receiver shuttles). The technique 302 may be referred to as a deviated-well or a walkabove VSP. As to the offset VSP technique 303, in the example of FIG. 3, an array of seismic receivers 344 may be clamped in a bore 343 and a seismic source 342 may be placed a distance away. In such an example, non-vertical incidence can give rise to P- to S-wave conversion. As to the walkaway VSP technique 304, as an example, a seismic source 342 may be activated at numerous positions along a line on the surface 349. The techniques 301, 302, 303 and 304 may be implemented as onshore and/or offshore surveys.

As may be appreciated from the examples of FIG. 3, a borehole seismic survey may be categorized by a survey geometry, which may be determined by one or more of source offset, borehole trajectory and receiver array depth. For example, a survey geometry may determine dip range of interfaces and the subsurface volume that may be imaged. A survey may define a region, for example, a region about a borehole (e.g., via one or more dimensions that may be defined with respect to the borehole). As an example, positions of equipment may define, at least in part, a survey geometry (e.g., and a region associated with a borehole, wellbore, etc.).

Again, as to a zero-offset VSP, a set-up may include a borehole seismic receiver array and a near-borehole seismic source. Such an approach may, where formation dips do not exceed some limit, acquire reflections from a relatively narrow window around the borehole. An output from a zero-offset VSP may be a corridor stack. A corridor stack may be created by summing VSP signals that immediately follow first arrivals into a single seismic trace. In such an example, the trace may be duplicated several times for clarity and comparison with surface seismic images. Processing of acquired data may yield velocities of formations at different depths, which may, for example, be tied to well log properties and interpreted for detection and prediction of zones (e.g., overpressured zones, etc.). A velocity model may be used to generate "synthetics" (e.g., model-based traces), for example, as part of a process to identify multiples in surface seismic processing.

As to a zero-offset VSP (e.g., a deviated-well, walkabove, or vertical-incidence VSP technique), a set-up may be configured to help assure that a source remains substantially above a receiver or receivers deployed in a deviated or horizontal wellbore. Such a survey may acquire a 2D image of a region below the borehole. As an example, in addition to formation velocities and an image for correlation with surface seismic data, a walkabove VSP may provide lateral coverage and information as to fault and dip identification beneath a well.

As to an offset VSP, a set-up may include a source placed at a horizontal distance, or offset, from a wellbore. Such an approach may produce a 2D image. As an example, a receiver array or receiver arrays may be deployed at a range of depths in a borehole. As an example, offset increases can increase volume of subsurface imaged and can map reflectors at a distance from a borehole, for example, that may be related to offset and subsurface velocities. As an example, added volume of "illumination" may enhance usefulness of an image, for example, for correlation with one or more surface seismic images and, for example, for identification of faulting and dip laterally away from a borehole. As the conversion of P-waves to S-waves tends to increase with offset, an offset VSP technique may allow for one or more of shear wave, amplitude variation with offset (AVO) and anisotropy analyses. As an example, degree to which P-waves convert to S-waves may depend on offset and on interface rock properties.

As to a walkaway VSP, a source may be offset from vertical incidence, however, a borehole receiver array may remain stationary, for example, while a source moves away from it, or "walks away", for example, over a range of offsets. In such an example, a range of offsets acquired in a walkaway VSP may be useful for analysis of one or more of shear-wave, AVO and anisotropy effects.

The example techniques 301, 302, 303 and 304 of FIG. 3 may be applied, for example, to provide information and/or images in one or two dimensions (e.g., or optionally three-dimensions, depending on implementation).

As an example, a 3D VSP technique may be implemented with respect to an onshore and/or an offshore environment. As an example, an acquisition technique for an onshore (e.g., land-based) survey may include positioning a source or sources along a line or lines of a grid; whereas, in an offshore implementation, source positions may be laid out in lines or in a spiral centered near a well.

A 3D acquisition technique may help to illuminate one or more 3D structures (e.g., one or more features in a geologic environment). Information acquired from a 3D VSP may assist with exploration and development, pre-job modeling and planning, etc. A 3D VSP may fill in one or more regions that lack surface seismic survey information, for example, due to interfering surface infrastructure or difficult subsurface conditions, such as, for example, shallow gas, which may disrupt propagation of P-waves (e.g., seismic energy traveling through fluid may exhibit signal characteristics that differ from those of seismic energy traveling through rock).

A VSP may find use to tie time-based surface seismic images to one or more depth-based well logs. For example, in an exploration area, a nearest well may be quite distant such that a VSP is not available for calibration before drilling begins on a new well. Without accurate time-depth correlation, depth estimates derived from surface seismic images may include some uncertainties, which may, for example, add risk and cost (e.g., as to contingency planning for drilling programs). A so-called intermediate VSP may be performed, for example, to help develop a time-depth correlation. For example, an intermediate VSP may include running a wireline VSP before reaching a total depth. Such a survey may, for example, provide for a relatively reliable time-depth conversion; however, it may also add cost and inefficiency to a drilling operation and, for example, it may come too late to forecast drilling trouble. A seismic while drilling process may be implemented, for example, to help reduce uncertainty in time-depth correlation without having to stop a drilling process. Such an approach may provide real-time seismic waveforms that can allow an operator to look ahead of a drill bit, for example, to help guide a drill string to a target total depth.

A data acquisition technique may be implemented to help understand a fracture, fractures, a fracture network, etc. As an example, a fracture may be a natural fracture, a hydraulic fracture, a fracture stemming from production, etc. As an example, seismic data may help to characterize direction and magnitude of anisotropy that may arise from aligned natural fractures. A survey may include use of offset source locations that may span, for example, a circular arc to probe a formation (e.g., from a wide range of azimuths). As an example, a hydraulically induced fracture or fractures may be monitored using one or more borehole seismic methods. For example, while a fracture is being created in a treatment well, a multicomponent receiver array in a monitor well may be used to record microseismic activity generated by a fracturing process.

Seismic surveys may be acquired at different stages in the life of a reservoir. As an example, one or more of offset VSPs, walkaway VSPs, 3D VSPs, etc. may be acquired in time-lapse fashion, for example, before and after production. Time-lapse surveys (e.g., with time as a dimension) may reveal changes in position of fluid contacts, changes in fluid content, and other variations, such as pore pressure, stress and temperature. VSP techniques may be seen as evolving, for example, from being a time-depth tie for surface seismic data to being capable of encompassing a range of solutions to various types of questions germane to exploration, production, etc.

As mentioned, an output from a zero-offset VSP may be one or more corridor stacks. In the examples of FIGS. 1, 2 and 3, receivers (e.g., geophones) are shown as being located below a surface or surfaces. As such, they may respond to both downgoing and upgoing energy, which may allow insight into properties of propagating wavelets and reflective/transmissive earth processes.

As mentioned, equipment may include fracturing equipment where such equipment may be employed to generate one or more fractures in a geologic environment. As an example, a method to generate fractures can include a delivery block for delivering fluid to a subterranean environment, a monitor block for monitoring fluid pressure and a generation block for generating fractures via fluid pressure. As an example, the generation block may include activating one or more fractures. As an example, the generation block may include generating and activating fractures. As an example, activation may occur with respect to a pre-existing feature such as a fault or a fracture. As an example, a pre-existing fracture network may be at least in part activated via a method that includes applying fluid pressure in a subterranean environment. The foregoing method may be referred to as a treatment method or a "treatment". Such a method may include pumping an engineered fluid (e.g., a treatment fluid) at high pressure and rate into a reservoir via one or more bores, for example, to one or more intervals to be treated, which may cause a fracture or fractures to open (e.g., new, pre-existing, etc.).

As an example, a fracture may be defined as including "wings" that extend outwardly from a bore. Such wings may extend away from a bore in opposing directions, for example, according in part to natural stresses within a formation. As an example, proppant may be mixed with a treatment fluid to keep a fracture (or fractures) open when a treatment is complete. Hydraulic fracturing may create high-conductivity communication with an area of a formation and, for example, may bypass damage that may exist in a near-wellbore area. As an example, stimulation treatment may occur in stages. For example, after completing a first stage, data may be acquired and analyzed for planning and/or performance of a subsequent stage.

Size and orientation of a fracture, and the magnitude of the pressure to create it, may be dictated at least in part by a formation's in situ stress field. As an example, a stress field may be defined by three principal compressive stresses, which are oriented perpendicular to each other. The magnitudes and orientations of these three principal stresses may be determined by the tectonic regime in the region and by depth, pore pressure and rock properties, which determine how stress is transmitted and distributed among formations.

Where fluid pressure is monitored, a sudden drop in pressure can indicate fracture initiation of a stimulation treatment, as fluid flows into the fractured formation. As an example, to break rock in a target interval, fracture initiation pressure exceeds a sum of the minimum principal stress plus the tensile strength of the rock. To determine fracture closure pressure, a process may allow pressure to subside until it indicates that a fracture has closed. A fracture reopening pressure may be determined by pressurizing a zone until a leveling of pressure indicates the fracture has reopened. The closure and reopening pressures tend to be controlled by the minimum principal compressive stress (e.g., where induced downhole pressures exceed minimum principal stress to extend fracture length).

After performing fracture initiation, a zone may be pressurized for furthering stimulation treatment. As an example, a zone may be pressurized to a fracture propagation pressure, which is greater than a fracture closure pressure. The difference may be referred to as the net pressure, which represents a sum of frictional pressure drop and fracture-tip resistance to propagation (e.g., further propagation).

As an example, a method may include seismic monitoring during a treatment operation (e.g., to monitor fracture initiation, growth, etc.). For example, as fracturing fluid forces rock to crack and fractures to grow, small fragments of rock break, causing tiny seismic emissions, called microseisms. Equipment may be positioned in a field, in a bore, etc. to sense such emissions and to process acquired data, for example, to locate microseisms in the subsurface (e.g., to locate hypocenters). Information as to direction of fracture growth may allow for actions that can "steer" a fracture into a desired zone(s) or, for example, to halt a treatment before a fracture grows out of an intended zone. Seismic information (e.g., information associated with microseisms) may be used to plan one or more stages of fracturing operations (e.g., location, pressure, etc.).

Figure 4:
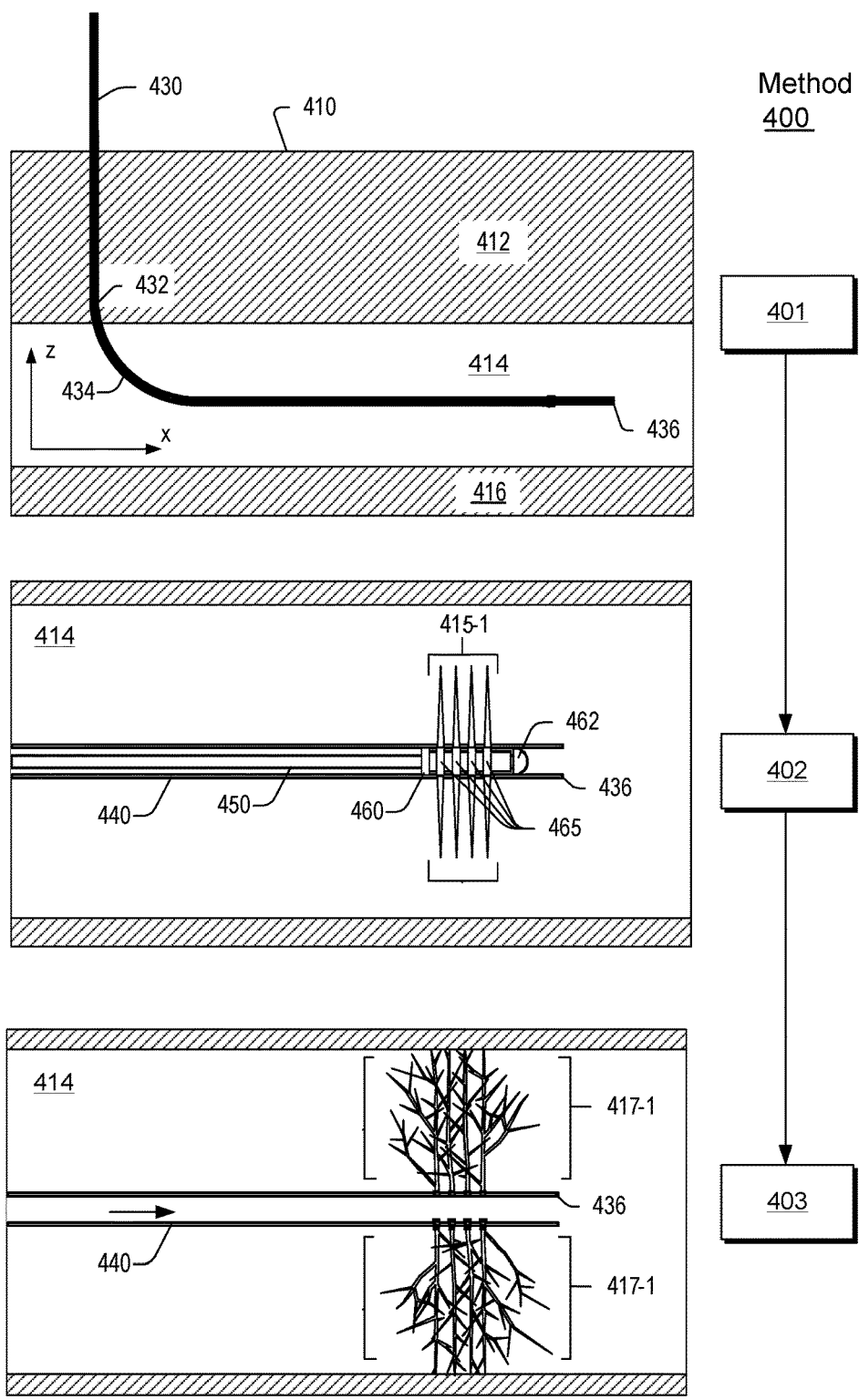
FIG. 4 illustrates an example of a portion of a method.
Figure 5:
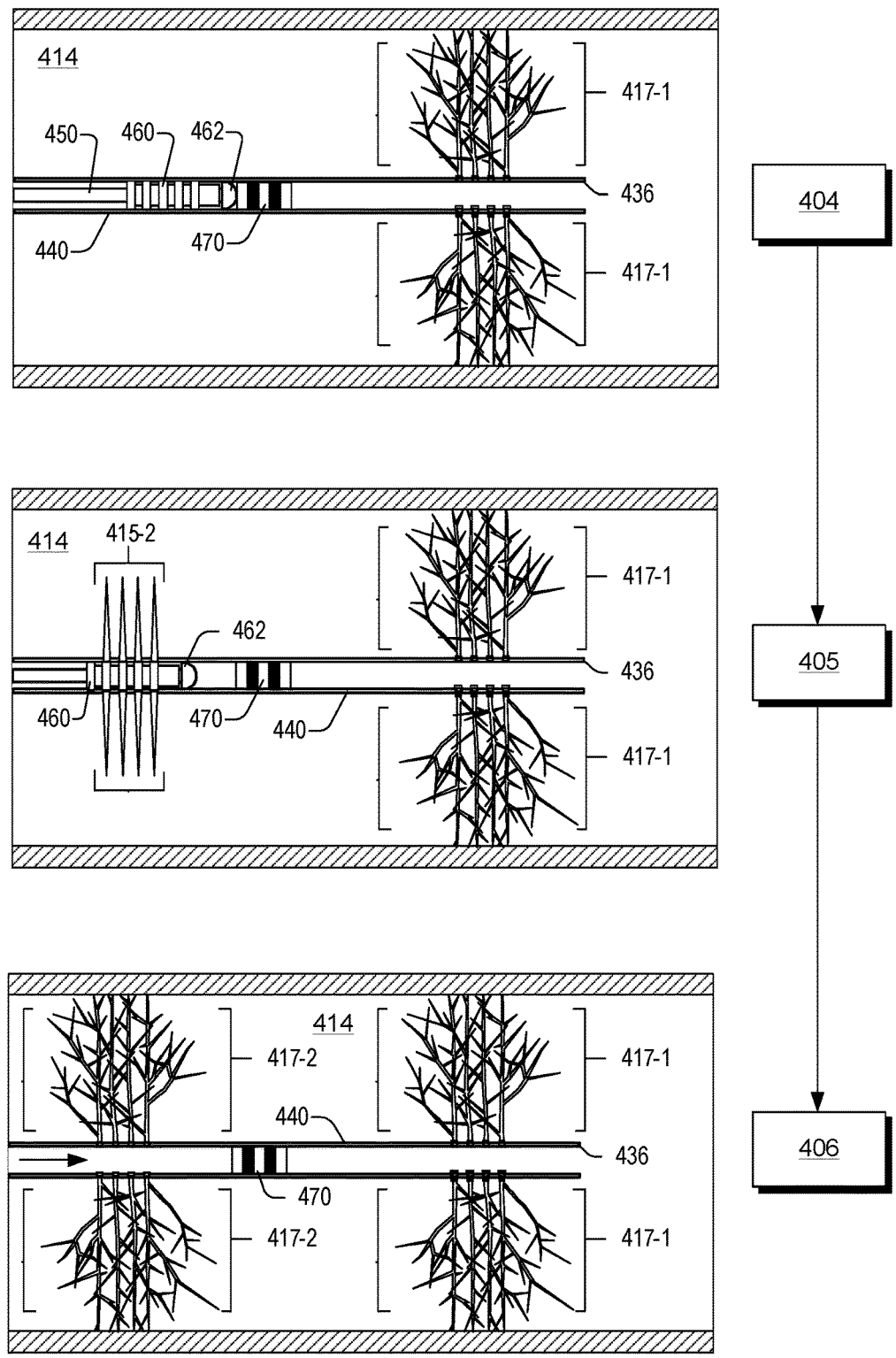
FIG. 5 illustrates an example of a portion of the method of FIG. 4.

FIGS. 4 and 5 show an example of a method 400 that includes generating fractures. As shown, the method 400 can include various operational blocks such as one or more of the blocks 401, 402, 403, 404, 405 and 406. The block 401 may be a drilling block that includes drilling into a formation 410 that includes layers 412, 414 and 416 to form a bore 430 with a kickoff 432 to a portion defined by a heel 434 and a toe 436, for example, within the layer 414.

As illustrated with respect to the block 402, the bore 430 may be at least partially cased with casing 440 into which a string or line 450 may be introduced that carries a perforator 460. As shown, the perforator 460 can include a distal end 462 and charge positions 465 associated with activatable charges that can perforate the casing 440 and form channels 415-1 in the layer 414. Next, per the block 403, fluid may be introduced into the bore 430 between the heel 434 and the toe 436 where the fluid passes through the perforations in the casing 440 and into the channels 415-1. Where such fluid is under pressure, the pressure may be sufficient to fracture the layer 414, for example, to form fractures 417-1. In the block 403, the fractures 417-1 may be first stage fractures, for example, of a multistage fracturing operation.

Per the block 404, additional operations are performed for further fracturing of the layer 414. For example, a plug 470 may be introduced into the bore 430 between the heel 434 and the toe 436 and positioned, for example, in a region between first stage perforations of the casing 440 and the heel 434. Per the block 405, the perforator 460 may be activated to form additional perforations in the casing 440 (e.g., second stage perforations) as well as channels 415-2 in the layer 414 (e.g., second stage channels). Per the block 406, fluid may be introduced while the plug 470 is disposed in the bore 430, for example, to isolate a portion of the bore 430 such that fluid pressure may build to a level sufficient to form fractures 417-2 in the layer 414 (e.g., second stage fractures).

In a method such as the method 400 of FIGS. 4 and 5, it may be desirable that a plug (e.g., the plug 470) includes properties suited to one or more operations. Properties of a plug may include mechanical properties (e.g., sufficient strength to withstand pressure associated with fracture generation, etc.) and may include one or more other types of properties (e.g., chemical, electrical, etc.). As an example, it may be desirable that a plug degrades, that a plug seat degrades, that at least a portion of a borehole tool degrades, etc. For example, a plug may be manufactured with properties such that the plug withstands, for a period of time, conditions associated with an operation and then degrades (e.g., when exposed to one or more conditions). In such an example, where the plug acts to block a passage for an operation, upon degradation, the passage may become unblocked, which may allow for one or more subsequent operations.

As an example, a component may be degradable upon contact with a fluid such as an aqueous ionic fluid (e.g., saline fluid, etc.). As an example, a component may be degradable upon contact with well fluid that includes water (e.g., consider well fluid that includes oil and water, etc.). As an example, a component may be degradable upon contact with a fracturing fluid (e.g., a hydraulic fracturing fluid). As an example, a degradation time may depend on a component dimension or dimensions and can differ for various temperatures where a component is in contact with a fluid that is at least in part aqueous (e.g., include water as a medium, a solvent, a phase, etc.).

Figure 6:
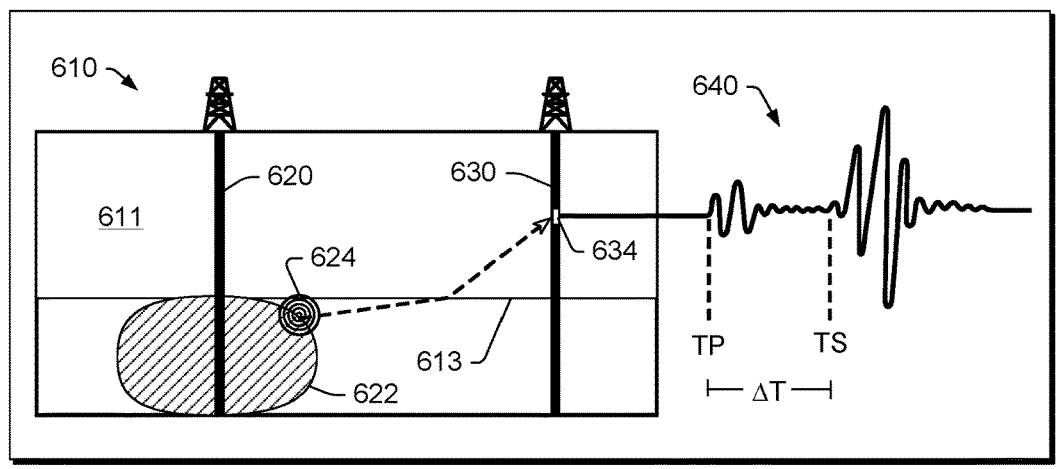
FIG. 6 illustrates examples of techniques and equipment associated with microseismicity.
Figure 6:
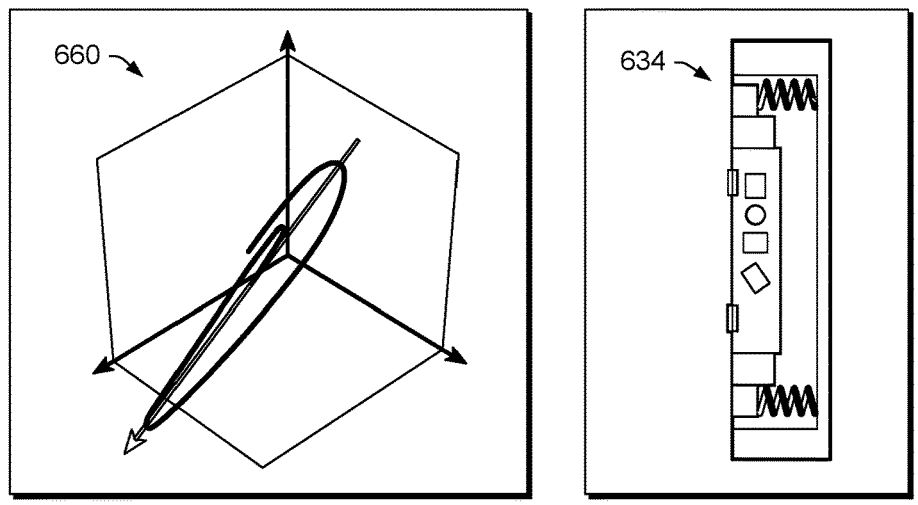
Figure 6:
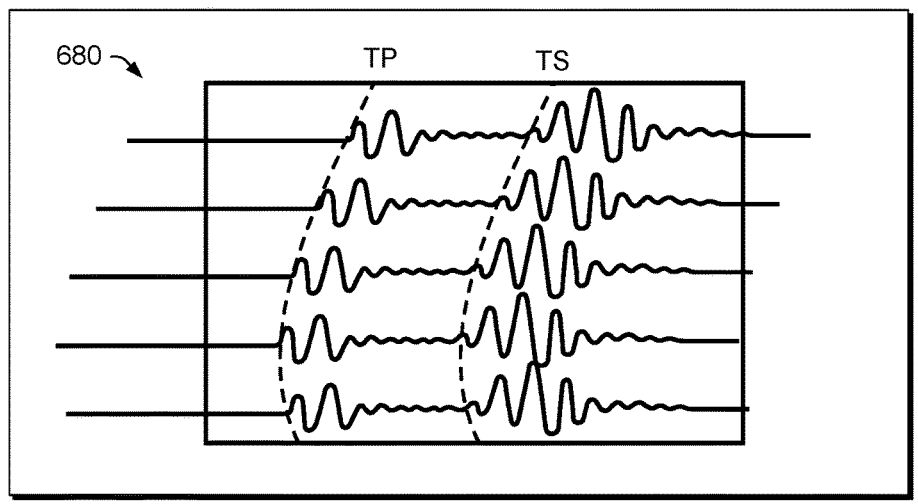

FIG. 6 shows an example of a microseismic survey 610, which may be considered to be a method that implements equipment for sensing elastic wave emissions of microseismic events (e.g., elastic wave energy emissions caused directly or indirectly by a treatment). As shown, the survey 610 is performed with respect to a geologic environment 611 that may include a reflector 613. The survey 610 includes an injection bore 620 and a monitoring bore 630. Fluid injected via the injection bore 620 generates a fracture 622 that is associated with microseismic events such as the event 624. As shown in the example of FIG. 6, energy of a microseismic event may travel through a portion of the geologic environment 611, optionally interacting with one or more reflectors 613, and pass to the monitoring bore 630 where at least a portion of the energy may be sensed via a sensing unit 634, which may include a shaker, three-component geophone accelerometers isolated from a sensing unit body (e.g., via springs, etc.), coupling contacts, etc. In the example of FIG. 6, the sensed energy includes compressional wave energy (P-wave) and shear wave energy (S-wave).

Sensed energy may be analyzed, for example, to determine one or more of distance and azimuth from a sensor to a source of an elastic wave emission and depth of a source of an elastic wave emission (e.g., to determine location information, etc.). In a fracturing operation, a source of an elastic wave emission may be registered as an event, which can include a time, a location and one or more acquired signals (e.g., traces). As an example, information associated with an event may be analyzed to determine one or more of location and magnitude.

As an example, distance (d) to an event may be derived by measuring a time difference ($\Delta T$) between arrival times for a P-wave (TP) and an S-wave (TS), as shown in an example approximate signal diagram 640 of FIG. 6. The value of the distance d may depend on use of a velocity model that characterizes velocity of elastic wave energy (e.g., elastic waves) with respect to depth. A velocity model may describe P-wave velocity and S-wave velocity with respect to depth (e.g., variation in material, pressures, etc. of a geologic environment).

As an example, azimuth to a microseismic event may be determined by analyzing particle motion of P-waves, for example, using hodograms. FIG. 6 shows an example of a hodogram 660 as a plot of sensed energy along at least two geophone axes as a function of time. A hodogram may be a graph or curve that displays time versus distance of motion. For example, a hodogram may be a crossplot of two components of particle motion over a time window. Hodograms may be part of a borehole seismologic survey where they may be used to determine arrival directions of waves and to detect shear-wave splitting.

As to determination of depth of a microseismic event, as illustrated in a plot 680, P-wave and S-wave arrival delays between sensors, or moveout, at the monitoring bore 630 may be analyzed.

Microseismicity recorded during multistage fracture treatments may provide disperse "clouds" of events (e.g., located at individual event hypocenters). As an example, a method can include analyzing clouds of events to extract planar-type features, which may be indicative of fracture location, directions of stresses, etc.

Effectiveness of hydro-fracturing, as a stimulation method, can depend on multiple variables and competing effects. For instance, a hydraulic fracture, or stage-fracture, may be expected to propagate deeply into a pay zone and increase surface area through which hydrocarbons can be drained from a formation to a well. As to predicting behavior, for example, via modeling, various variables (e.g., local stress, natural fracture network, injection rate, fluid viscosity, etc.) can act together to determine the size, orientation, aperture and geometry of the resulting stage-fracture values, for such variables may be not be known a priori, may be known with some uncertainty, etc.

During creation or propagation, a hydraulic fracture introduces changes in a stress field around it. For example, an increase in the minimum horizontal stress, $S_{hmin}$ (e.g., "stress shadow effect"), can affect pressure needed to open a fracture (e.g., a subsequent fracture) and its shape, thus potentially affecting in a negative way effectiveness of a hydraulic-fracturing job. On the other hand, these stress changes may also "reactivate" pre-existing natural fractures thorough phenomena such as shearing and dilatation, which potentially could have a positive effect of increasing permeability within an Estimated Stimulation Volume (ESV).

As an example, a stimulation process may reactivate a number of natural fractures to increase permeability within a region of interest, which may be, post-stimulation, an ESV. As an example, a natural fracture may be considered to be active at some time or times during its existence and may be considered to be reactivated in response to an intervention such as a stimulation treatment (e.g., hydraulic fracturing, etc.).

Stress shadows, microseismicity, stimulated rock volume and production tend to be related in a complex manner. It may be desirable to understand better such processes, for example, to help predict magnitude and consequences of a stress shadow and ESV. As an example, a method may include establishing one or more linkages between fracture geometry, microseismicity, stress shadow, ESV and permeability.

As an example, a method can include defining total reactivated fracture volume (RFV) in a manner where it may be estimated by calculations based at least in part on an elasto-plastic solution to a problem of opening and shearing of one or more fractures under given stress conditions. Such an approach can establish one or more links between factors such as, for example, dynamic stress changes, micro-seismic activity, effective changes in fracture aperture, and permeability. As an example, a method may be a workflow that may include worksteps. As an example, a method can include receiving input information from a multidimensional mechanical earth model (e.g., consider a 3D MEM) and receiving input information as to fracture geometry (e.g., consider geometry of a discrete fracture network (DFN)). In such an example, the method may be formulated numerically where one or more numerical techniques may be applied to solve equations for output values (e.g., results). As an example, starting from a 3D MEM and guidelines on fracture geometry, a numerical solution may be output for permeability enhancements, microseismicity and RFV.

Figure 7:
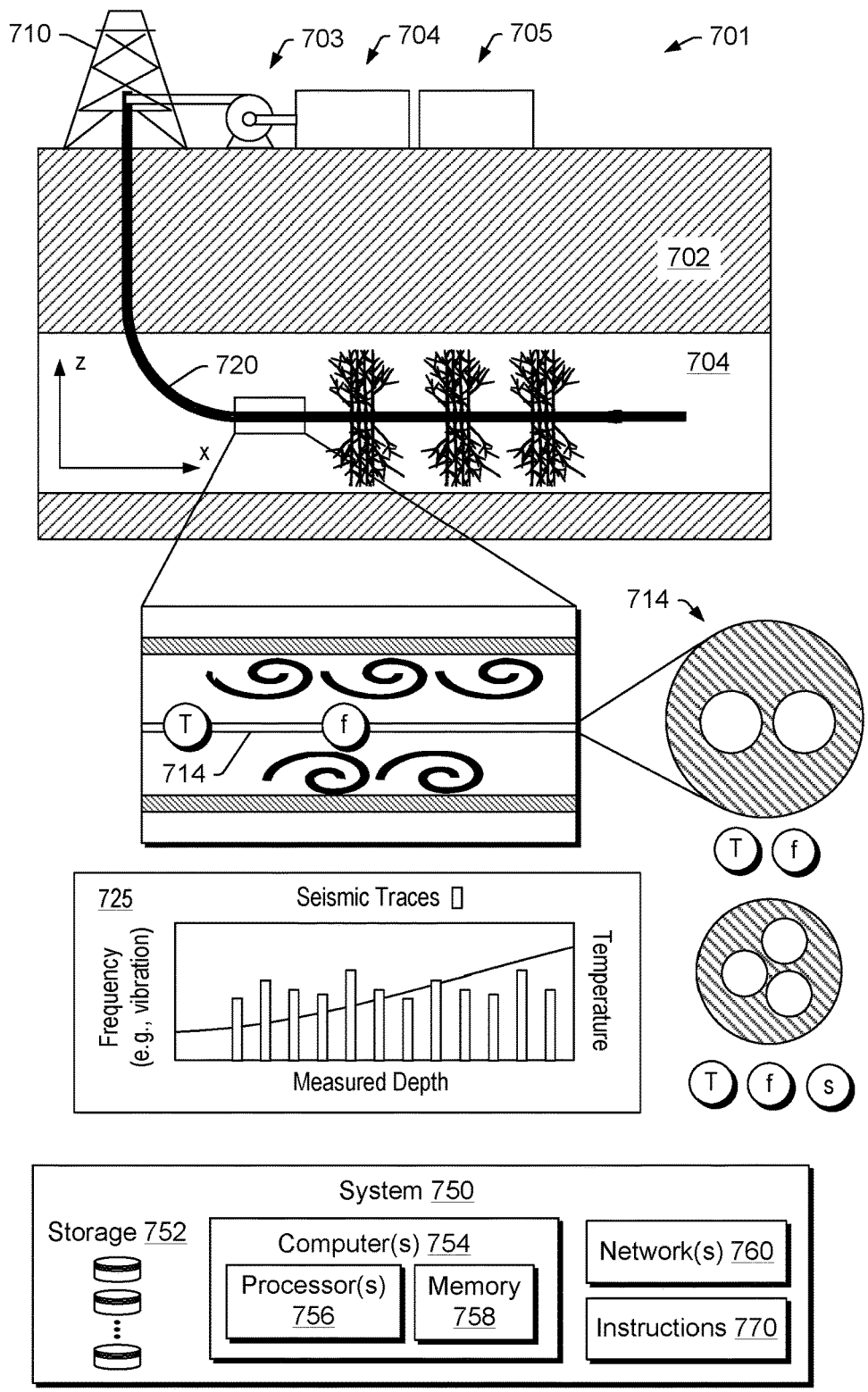
FIG. 7 illustrates an example of a geologic environment, an example of a fiber cable and an example of a system.

FIG. 7 shows an example of a geologic environment 701 that includes a pump 703, pump equipment 704 and monitoring equipment 705. As shown, a rig 710 can be located at a surface location along with the pump 703, pump equipment 704 and monitoring equipment 705 where a well 720 extends into various layers 702 and 704 of the geologic environment 701. The well 720 and one or more fracture zones may be described at least in part with respect to a coordinate system such as, for example, a Cartesian coordinate system (see, e.g., z and x axes).

In the example of FIG. 7, a fiber cable 714 extends into the well 720 where the fiber cable 714 can include one or more individual fibers such as, for example, optical fibers. In the example of FIG. 7, the fiber cable 714 is shown as including one or more fibers for frequency and temperature sensing. As to frequency, the fiber cable 714 can include an outer surface that is in fluid such that it can sense characteristics of flow of the fluid in the well. For example, fluid flowing in a conduit (e.g., tubing, a casing, etc.) can result in vortex formation where vortices may shed at one or more frequencies that can impart energy that is sensed by the fiber cable 714. For example, vortices may shed from a surface where shedding frequency depends at least in part on fluid velocity. As an example, the Reynolds number (Re, a ratio of inertial forces to viscous forces) may be utilized to determine and/or estimate whether flow is laminar or turbulent. Various types of flow regimes may exist, where fluid flow noise may be sensed, for example, as vibrations in the fluid and/or materials of a well (e.g., casing, tubing, etc.). Where fluid is turbulent, it may be chaotic and generate a chaotic fluid flow noise that can be sensed by a fiber cable and that can be analyzed, for example, as to frequency, energy, etc. As an example, a method can include calculating a fluid velocity based on a vortex shedding frequency. As an example, a method can include estimating a fluid regime type (e.g., using the Reynolds number, etc.) to determine whether sensed data are associated with flow or a lack of a type of flow regime. As an example, a method can include analyzing temperature of fluid as sensed via a fiber cable to determine one or more aspects as to fluid flow in a well.

As an example, the fiber cable 714 can include internals that provide for sensing of vibration (e.g., frequency), temperature and strain. As an example, flow may be discerned from one or more of vibration and strain. As an example, a fluid source may be discerned based at least in part on temperature. For example, consider flow-back of fluid from a reservoir (e.g., formation) to a well as being at a different temperature than fluid flowing into a well. One or more heat transfer, heat conservation, etc. equations may be utilized to characterize heat flow. A number such as Prandtl number (Pr) may be determined as the ratio of momentum diffusivity to thermal diffusivity.

As an example, a vortex shedding sensor may be oriented along a direction of flow or at an angle with respect to flow. As an example, a vortex shedding sensor can include a portion that acts as a bluff body within a flow field where vortices are generated by flow past the bluff body and where detachment of the vortices can impart energy that may be repeated at a particular frequency or frequencies that can be associated with a fluid velocity (e.g., flow rate, etc.).

As an example, a fiber cable can operate as a Bragg grating sensor and be referred to as a fiber Bragg grating (FBG) sensor. As an example, a FBG sensor can sense information using a core of a single mode optical fiber, which may be relatively small in diameter (e.g., of the order of microns, tens of microns, etc.). As an example, a FBG sensor can include outer cladding and a protective polymer coating. As an example, a FBG sensor may be arranged to sense one or more types of physical phenomena. For example, consider sensing strain, temperature, pressure (e.g., acoustic pressure as vibration), etc.

As an example, the fiber cable 714 in the example of FIG. 7 may be arranged to sense one or more physical phenomena, directly and/or indirectly, such as, for example, strain, temperature, pressure, frequency, vibration, flow, etc. As an example, the fiber cable 714 may be a distributed monitoring system (DMS) for distributed pressure sensing (DPS), distributed temperature sensing (DTS), distributed frequency sensing (DFS), etc.

As an example, the fiber cable 714 can provide frequency information as seismic traces at points along intervals of the fiber cable 714. For example, frequency information can be acquired as seismic data (e.g., vibration data) at intervals of about a meter or several meters along a fiber cable.

As an example, the fiber cable 714, which may be referred to as a fiber cable sensor, can include an armor exterior (e.g., armor outer layer) through which energy may be transmitted (e.g., energy associated with vortex shedding, etc.). As an example, a diameter of the fiber cable 714 may be of the order of about 1 cm. As an example, the fiber cable 714 can include a plurality of fibers and a plurality of electrical conductors. As an example, the fiber cable 714 can include internals that can sense temperature, vibration and strain. As an example, vibration may be vibration associated with vortices associated with flow of fluid (e.g., fluids) in a well.

In the example of FIG. 7, a plot 725 is shown that indicates how data may be plotted with respect to measured depth (MD) in the well 720. For example, one or more frequencies and/or one or more temperatures may be plotted with respect to measured depth (MD) in the well 720 and/or according to one or more other measures, coordinates, etc. In the plot 725, the frequency data is shown as seismic trace data for a plurality of seismic traces acquired at various points along a fiber cable such as the fiber cable 714. As an example, the plot 725 can correspond to an instant in time, for example, time window for one or more sensed values. As an example, a series of such plots may be generated for data over a period of time.

As explained below, frequency data can be vibration data that includes information associated with acoustic energy in a well. For example, such data can include information associated with traveling waves that travel at least in part in fluid within a well (e.g., a well bore, a conduit, tubing, etc.). As an example, desired frequency data associated with fluid flow can be flow noise driven data where the flow noise is caused by fluid moving down a well (e.g., vortex shedding, etc.).

As an example, a traveling wave may be generated during a treatment process due to, for example, pressure fluctuation at a surface location. For example, a pump can be a piston pump that includes one or more pistons. In such an example, the action of the piston or pistons can generate traveling waves that are transmitted to fluid and/or well structures (e.g., casing, tubing, etc.) that travel to downhole locations where energy associated with such waves is sensed by a fiber cable sensor (e.g., along various points, etc.). As an example, traveling wave signals may be utilized to determine or estimate one or more fluid properties, etc. (e.g., fluid density, reflection points, etc.).

As an example, a pressure weight may be of the order of thousands of pounds per square inch (psi). As an example, a flow rate may be of the order of tens of barrels of fluid per minute. As an example, a plurality of pumps may be provided, which may be vehicle-based pumps (e.g., pump trucks).

As an example, equipment may include one or more suppressors that act to suppress traveling waves (e.g., amplitude of traveling waves).

As shown in FIG. 7, a system 750 may include one or more information storage devices 752, one or more computers 754, one or more network interfaces 760 and instructions 770. As to the one or more computers 754, each computer may include one or more processors (e.g., or processing cores) 756 and memory 758 for storing instructions (e.g., the instructions 770, etc.), for example, executable by at least one of the one or more processors 756. As an example, a computer may include one or more network interfaces (e.g., wired or wireless), one or more graphics cards, a display interface (e.g., wired or wireless), etc. As an example, the system 750 may be configured to perform one or more methods.

As an example, the equipment 705 may optionally include one or more features of the system 750 and/or be operatively coupled to the system 750, for example, via one or more interfaces, wires, wireless equipment, etc.

Figure 8:
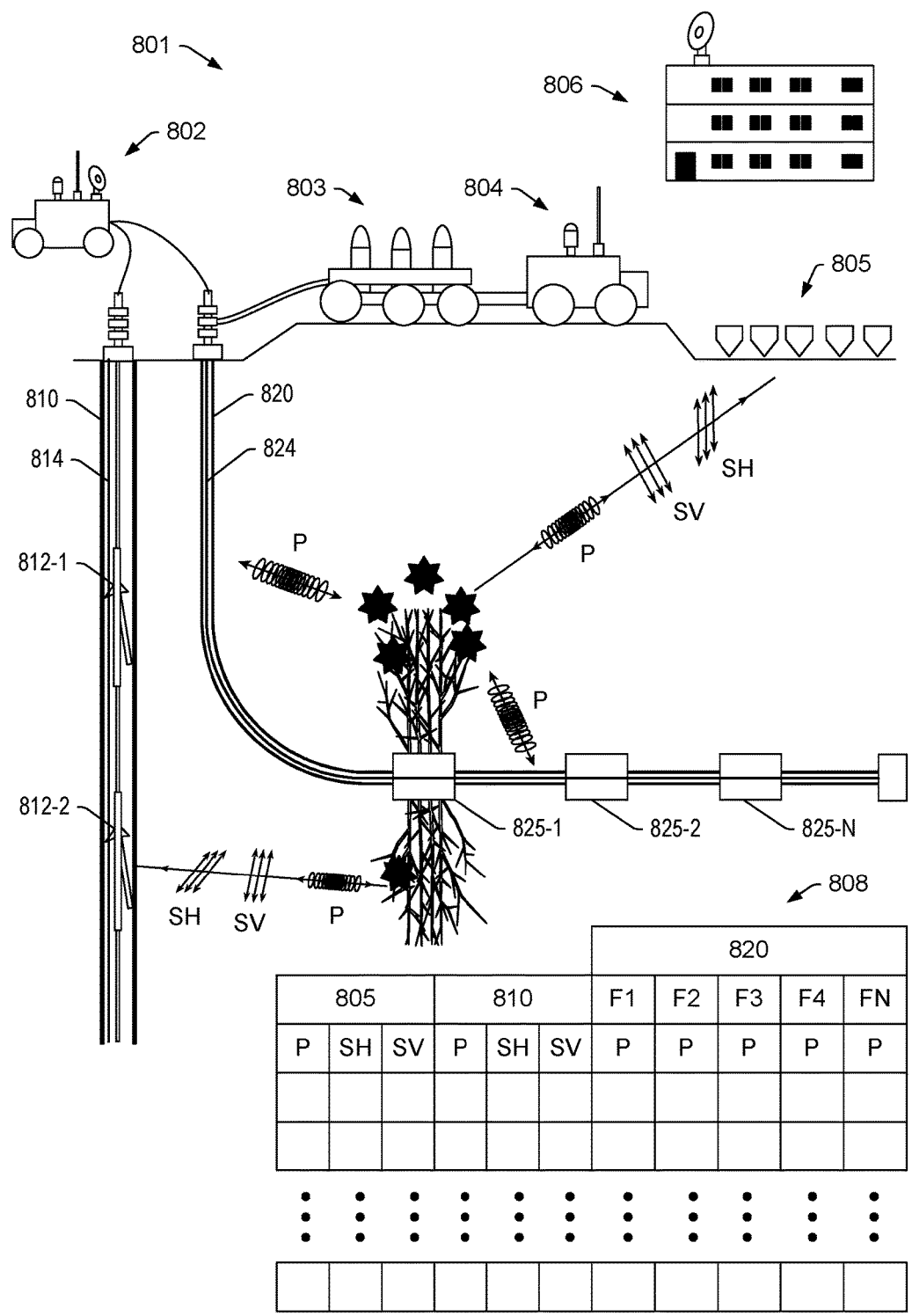
FIG. 8 illustrates examples of equipment in a geologic environment.

FIG. 8 shows an example of a geologic environment 801 that includes monitoring equipment 802, a pump 803, equipment 804, a seismic sensor or receiver array 805 and a remote facility 806. As shown, various types of communication may be implemented such that one or more pieces of equipment can communicate with one or more other pieces of equipment. As an example, equipment can include geo-positioning equipment (e.g., GPS, etc.). As an example, equipment can include one or more satellites and one or more satellite links (e.g., dishes, antennas, etc.).

In the example of FIG. 8, a monitoring well 810 and a treatment well 820 are disposed in the geologic environment 801. The monitoring well 810 includes a plurality of sensors 812-1 and 812-2 (see, e.g., the sensor 634 of FIG. 6) and a fiber cable sensor 814 and the treatment well 820 includes a fiber cable sensor 824 and one or more sets of perforations 825-1, 825-2, 825-N.

Equipment in the example of FIG. 8 can be utilized to perform one or more methods. As an example, data associated with hydraulic fracturing events may be acquired via various sensors. As an example, P-wave data (compressional wave data) can be utilized to assess such events (e.g., microseismic events). Such information may allow for adjusting one or more field operations. As an example, data acquired via the fiber cable sensor 824 can be utilized to generate information germane to a fluid flow-based treatment process (e.g., to determine where fluid pumped into a well may be flowing, etc.).

FIG. 8 shows an example of a table or data structure 808 with some examples of information that may be acquired via the seismic sensor array 805 (e.g., P-wave as "P", SH-wave as "SH", SV-wave as "SV"), sensors of the monitoring well 810 (e.g., P, SH, SV) and sensors of the treatment well 820 (e.g., P). In the example of FIG. 8, information may be sensed with respect to position, for example, sensor position, position along a fiber cable sensor, etc. As shown, the fiber cable sensor 824 may sense information at a variety of positions along the fiber cable sensor 824 within the treatment well 820 (see, e.g., F1, F2, F3, F4 to FN).

In the example of FIG. 8, the set of perforations 825-1 are shown as including associated fractures and microseismic events that generate energy that can be sensed by various sensors in the geologic environment 801. Arrows indicate a type of wave that may be sensed by an associate sensor. For example, as mentioned with respect to the table or data structure 808, the seismic sensor array 805 can sense P, SV and SH waves while the fiber cable sensor 824 can sense P waves.

As an example, the fiber cable sensor 824 can sense seismic energy as associated with fluid flow, for example, as associated with vortex shedding and/or one or more other phenomena of fluid flow in a well (e.g., a casing, tubing, a conduit, etc.). As an example, such seismic energy may be sensed as seismic traces that include information as to vibrations associated with fluid flow (e.g., fluid flow noise). As an example, the fiber cable sensor 824 may sense one or more of strain and temperature in addition to sensing seismic energy.

As an example, the equipment 802 can be operatively coupled to various sensors in the monitor well 810 and the treatment well 820. As an example, the equipment 802 may be on-site where wires are coupled from sensors to the equipment 802, which may be vehicle-based equipment (e.g., a data acquisition and/or control truck, etc.). As an example, the equipment 804 may control the pump 803 (e.g., or pumps) that can direct fluid into the treatment well 820. For example, a line is shown as a conduit that is operatively coupled between the pump 803 and the treatment well 820.

As an example, information acquired by the equipment 802 may be utilized to control one or more treatment processes controlled by the equipment 804. For example, the equipment 802 and the equipment 804 may be in direct and/or indirect communication via one or more communication links (e.g., wire, wireless, local, remote, etc.). In such an example, information acquired during a treatment process can be utilized in real-time (e.g., near real-time) to control the treatment process. For example, the equipment 802 can acquire data via sensors in the wells 810 and 820 and output information to the equipment 804 for purposes of controlling an on-going treatment process. As an example, such information may be utilized to control and/or to plan a subsequent treatment process, for example, additionally or alternatively to controlling an on-going treatment process.

As an example, a treatment process can include hydraulic fracturing. As an example, acquired data can include microseismic event data. As an example, a method can include determining the extent of rock fracturing induced by a treatment process, which may aim to stimulate a reservoir.

As an example, a method can include hydraulic fracture monitoring (HFM). As an example, a method can include monitoring one or more types of reservoir stimulation processes where one or more of such processes may be performed in stages. As an example, a stage may be of a duration of the order of hours or longer (e.g., several days). As an example, a method can include determining the presence, extent, and/or associated volume of induced fractures and fracture networks, which may be utilized for calculating an estimated reservoir stimulation volume (e.g., ESV) that may assist, for example, in economic evaluation of well performance.

As an example, a fiber cable sensor can acquire data that can help determine whether a set of perforations is taking fluid and/or, for example, which of a plurality of sets of perforations is or are taking fluid. As an example, a fiber cable sensor can be or include a fiber cable flow sensor, which is a fiber-based type of fluid flow sensor that can acquire fluid flow data.

As an example, a method can include delineating energy associated with a set or sets of perforations taking fluid in a treatment process. For example, a method can include generating a waterfall plot that is sharpened to delineate the energy associated with a set or sets of perforations taking fluid. In such an example, knowledge of such fluid flow can assist in assessment of perforation efficiency and fluid placement efficiency.

As an example, real-time data may be rendered to a display (e.g., as a plot, plots, etc.). As an example, real-time data may be assessed in real-time (e.g., near real-time that includes computation and transmission times) during perforation flow for one or more sets of perforations. In such an example, such assessments may allow a treatment process to be optimized during the treatment process in real-time (e.g., near real-time). Such assessments may be utilized for one or more post treatment analyses, for example, to plan, perform, control, etc. one or more future treatments (e.g., in a same well, a different well, etc.).

As an example, a method can include acquiring data germane to flow in one or more wells and/or via perforations in one or more wells. As an example, a method can include acquiring data germane to locating one or more fractures. As an example, a method can include a real-time portion and a post-process portion.

Figure 9:
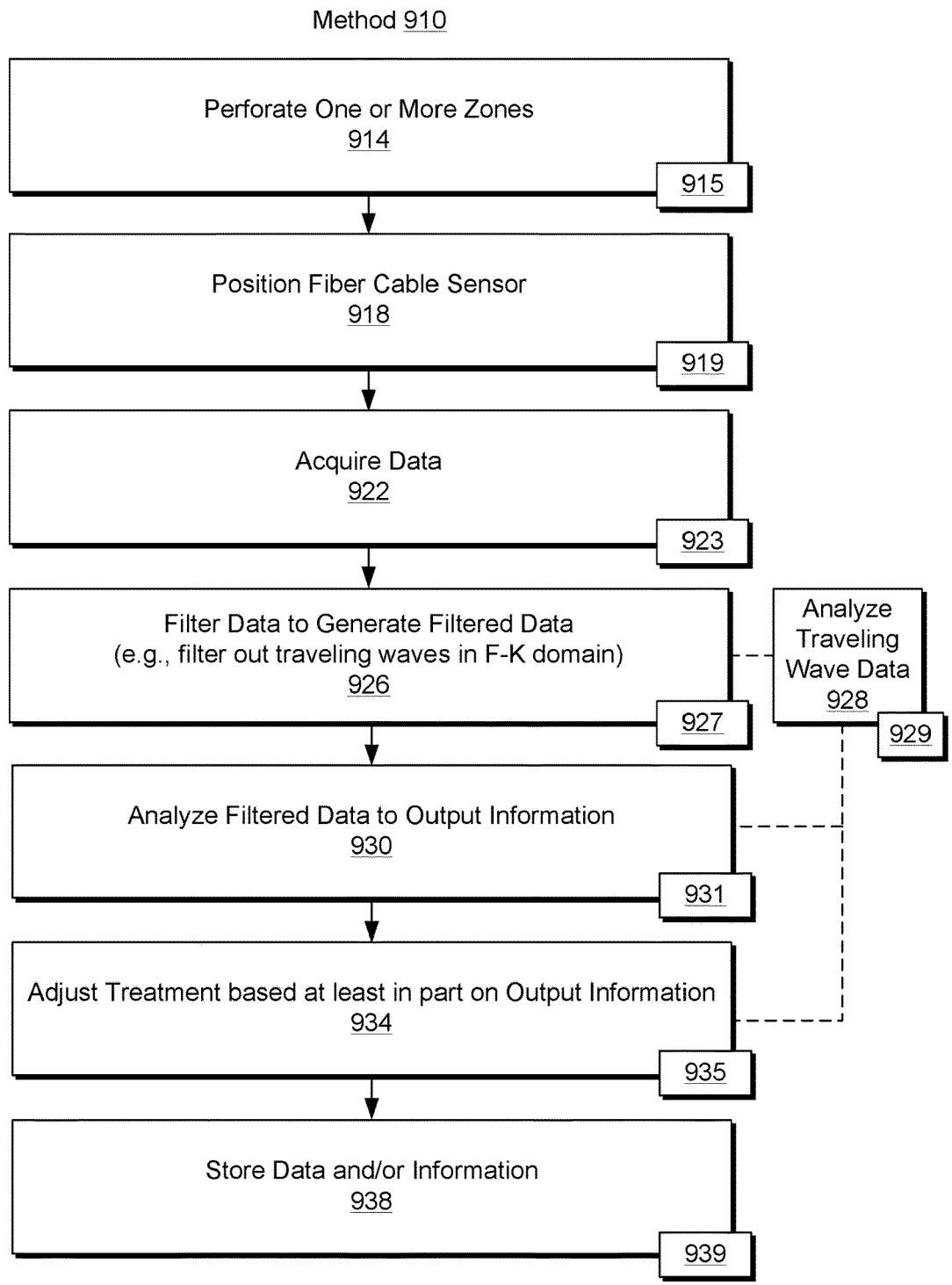
FIG. 9 illustrates an example of a method.

FIG. 9 shows an example of a method 910 that includes a perforation block 914 for perforating one or more zones in a well as part of a treatment process; a position block 918 for positioning a fiber cable sensor in the well and proximate to the one or more zones; an acquisition block 922 for acquiring data via the fiber cable sensor; a filter block 926 for filtering acquired data to generate filtered data (e.g., filtering out traveling waves in an F-K domain, etc.); an analysis block 930 for analyzing data to output information; an adjustment block 934 for adjusting the treatment process based at least in part on the output information; and a storage block 938 for storing data and/or information.

As an example, a method can include narrow band filtering. As an example, a method can include filtering out signals due to operation of one or more pumps (e.g., startup, shutdown, change in pump rate, pump piston generated waves, etc.).

As shown in the example of FIG. 9, an optional analysis block 928 can provide for analyzing at least a portion of the traveling wave data. For example, traveling wave data generated from a known source or sources (e.g., one or more pumps, etc.) may be analyzed to determine one or more fluid properties (e.g., fluid density, etc.). In such an example, information output via the block 928 may be received by one or more other blocks, which can include the adjustment block 934 for adjusting a treatment, for example, based at least in part on information output by the block 928.

As an example, the method 910 can include perforating zones in a well as part of a treatment process, lowering a fiber cable sensor into the well, measuring and displaying flow characteristics as acquired via the fiber cable sensor, running a F-K filter on waterfall plot data, assessing perforation flow characteristics and flow efficiency in each of the zones in the well, adjusting the treatment process as desired based on the real-time flow assessments to optimize the flow, and documenting and storing flow characteristics. As an example, such a method can include comparing documented and/or stored flow characteristics with respect to additional measured flow characteristics. For example, the measuring of flow characteristics in real-time can include comparing those flow characteristics to previously measured flow characteristics.

As an example, a method can include identifying traveling waves in data acquired by a fiber cable sensor. As an example, a method can include converting data into an F-K domain (e.g., F-K space), which can involve generating data as reciprocal wavelength with respect to frequency. As an example, such a method can include applying the Fourier transform for data over time and space. As an example, such a method may include plotting data in an F-K domain, for example, to distinguish subsets of data according to their direction and velocity, optionally via a technique that includes frequency and wavenumber.

As an example, a method can include use of an F-K transform/filter that is a two-dimensional Fourier transform over time and space. As an example, a space dimension may be controlled by trace spacing and can be sampled according to a Nyquist criterion, for example, to limit presence of spatial aliasing. In an F-K domain, data may be presented as a two-dimensional amplitude and phase spectrum.

As an example, traveling waves can be identified as down-going waves in an F-K domain. As an example, a method can include filtering out traveling waves from data in an F-K domain to generate residual data that can be analyzed with respect to one or more fluid related characteristics (e.g., fluid flow, etc.).

While an F-K domain and F-K filter are mentioned, separation of data or classification of data into desired signal and undesired signal may occur using one or more other approaches. In such approaches, signal associated with traveling waves can be reduced such that signal associated with fiber cable sensor desired data can be available, for example, for purposes of adjusting a treatment, etc.

As an example, a method can include transforming and filtering of fiber cable sensor data in real-time (e.g., near real-time) to generate output information that can be utilized to adjust one or more treatment processes, optionally an on-going treatment process.

As an example, a method can include determining which perforations are taking fluid and associating such information with information as to microseismic events. For example, where a set of perforations is deemed to be taking fluid, such a result can be used to look for microseismic events in a region proximate to that set of perforations (e.g., a particular stage of a hydraulic fracturing process, etc.).

The method 910 may be associated with various computer-readable storage media (CRM) blocks 915, 919, 923, 927, 929, 931, 935 and 939. Such blocks may include instructions suitable for execution by one or more processors (or processor cores) to instruct a computing device or system to perform one or more actions (e.g., processor-executable instructions). As an example, a single medium may be configured with instructions to allow for, at least in part, performance of various actions of the method 910. As an example, a computer-readable medium (CRM) may be a computer-readable storage medium that is not a carrier wave, that is not a signal and that is non-transitory.

As an example, a treatment process can be a type of stimulation process. As an example, a process can include pumping fluid, which can include one or more constituents (e.g., sand, chemical(s), etc.). As an example, fluid can include a chemical such as an acid. As an example, a treatment process can include process parameters such as, for example, pressure and/or slurry rate.

As an example, a process may be planned according to a pressure rate and concentration curve (PRC). As an example, during a process, a PRC may be generated. As an example, on-site equipment may be operated at least in part according to a PRC or PRCs.

Figure 10:
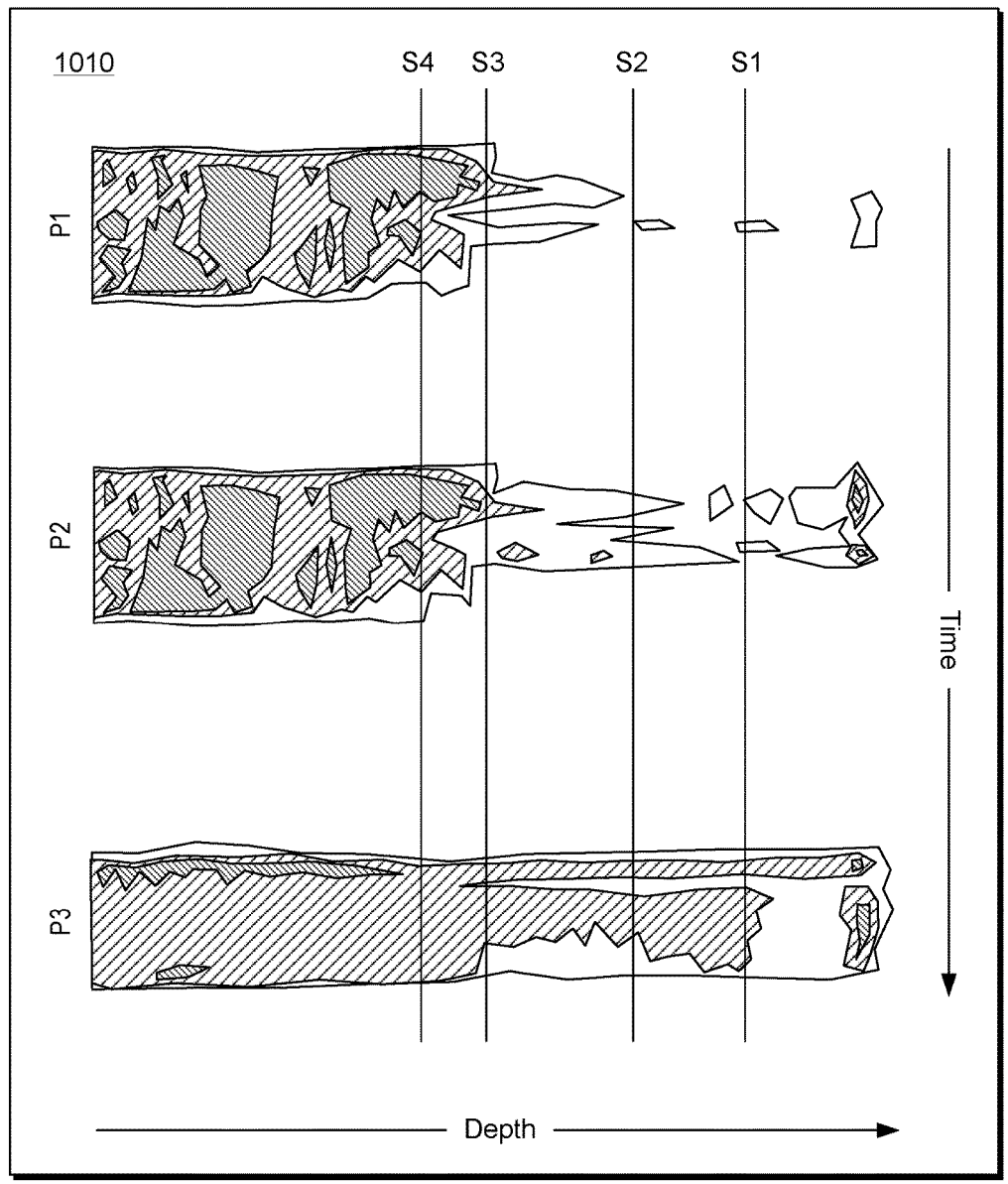
FIG. 10 illustrates an example of a plot.

FIG. 10 shows an example of a plot 1010 of data for a well, which may be referred to as a waterfall plot. Such data can be or can include output information such as that of the block 930 of the method 910 of FIG. 9. For example, the plot 1010 can be a plot of data based at least in part on data acquired via one or more fiber cable sensors such as, for example, the fiber cable 714 (e.g., a fiber cable sensor) of FIG. 7. In the example of FIG. 10, the plot 1010 corresponds to fiber cable data for vibration (e.g., frequency) that has been transformed to an F-K domain and filtered to reduce signal associated with traveling waves, which can output filtered data, which may be residual data of filtering. As explained below, the plot 1010 can indicate where and/or how fluid is flowing in a well, which can be a well with one or more sets of perforations.

In the example of FIG. 10, data are shown with respect to time, depth and process where contours correspond to flow where filled contours with finer hatching correspond to higher flow (e.g., flow energy as sensed via a fiber cable sensor). Processes P1, P2 and P3 are shown as corresponding to treatments applied to a well that has been subjected to four stages of hydraulic fracturing S1, S2, S3 and S4 where each of the stages S1, S2, S3 and S4 has a corresponding depth (e.g., for corresponding sets of perforations), which may be a measured depth (MD). The stages S1, S2, S3 and S4 may have been performed in a toe to heel manner, for example, starting at a distal portion of a well (e.g., at or near a toe of the well) and working towards a more proximate portion of a well with respect to surface (e.g., at or near a heel of the well).

As shown, each of the processes P1, P2 and P3 is applied over a period of time in a sequential manner. Each of the processes P1, P2 and P3 correspond to a treatment process with associated parameters where at least one parameter includes fluid pressure applied to the well, for example, via a pump such as, for example, the pump 703 of FIG. 7 or the pump 803 of FIG. 8, which, as mentioned, may be controlled via associated equipment (see, e.g., the equipment 704 and 804 of FIGS. 7 and 8, respectively). As an example, the process P1 may be at X1 barrels per minute and about Y1 pounds weight, the process P2 may be at X2 barrels per minute and about Y2 pounds weight, and the process P3 may be at X3 barrels per minute and about Y3 pounds weight. In the example of the plot 1010, the value of Y3 is greater than the value of Y2.

In the plot 1010, fluid flows from shallower to deeper depths and then, depending on stage characteristics (e.g., fracture characteristics), to fractures via perforations. For example, where a set of perforations has been efficiently generated to be in fluid communication with a region of a geologic environment, fluid can flow from a well into the geologic environment (e.g., a formation, reservoir formation, reservoir, etc.) via perforations of the set of perforations.

As an example, real-time data from sensors in the well may be utilized to adjust a process. For example, the data acquired during the process P1 may be utilized to adjust one or more parameters associated with the process P1 and/or P2 and/or P3.

In the example of FIG. 10, over the time period associated with the process P1, flow is minimal for depths corresponding to stages S1 and S2, over the time period associated with the process P2, flow is increased at depths corresponding to stages S1 and S2, and over the time period associated with the process P3, flow is further increased at depths corresponding to stages S1 and S2. As an example, the time periods associated with the processes P1, P2 and P3 may be of the order of an hour. In the plot 1010, the vertical time window may be about four hours.

The plot 1010 may be interpreted to suggest that, for the process P1, fluid flowing into the well is flowing predominantly via perforations of the set of perforations of the stage S4 and to a lesser extent via perforations of the set of perforations of the stage S3. Further, data as to flow energy sensed by the fiber cable sensor indicates that fluid flow is minimal to the perforations of the sets of perforations of stages S2 and S1.

As an example, the process P1 may be interpreted as being insufficient to cause a substantial amount of fluid to flow to perforations associated with stages S2 and S1. Further, the plot 1010 indicates that flow energy (e.g., amount of fluid flowing) varies during the time period of the process P1.

As an example, a waterfall plot such as the plot 1010 may be generated via a method such as, for example, the method 910 of FIG. 9. For example, the analysis block 930 can include generating a waterfall plot based at least in part on analyzing filtered data. As an example, a waterfall plot can be generated in real-time and be rendered to one or more displays that are part of on-site equipment. In such an example, an operator or operators may view the waterfall plot and adjust an on-going process and/or adjust a process to be applied (e.g., to the well).

As an example, a method can include documenting positions of one or more sets of perforations via analyzing data, which may be filtered data such as in the block 926 where the analyzing may be as in the block 930 and where positions of one or more sets of perforations may be output information.

As an example, an adjustment to a process can include blocking off perforations, which may be proximate perforations (e.g., of one or more stages), such that fluid (e.g., a slurry, etc.) can reach and flow through more distal perforations (e.g., of one or more other stages). As an example, a method may aim to treat stages from bottom (distal) to top (proximate).

As an example, a waterfall plot can allow an operator or operators to understand where fluid pumped into a well is flowing. In such an example, the fluid can be a slurry, for example, including proppant (e.g., sand, etc.).

Figure 11:
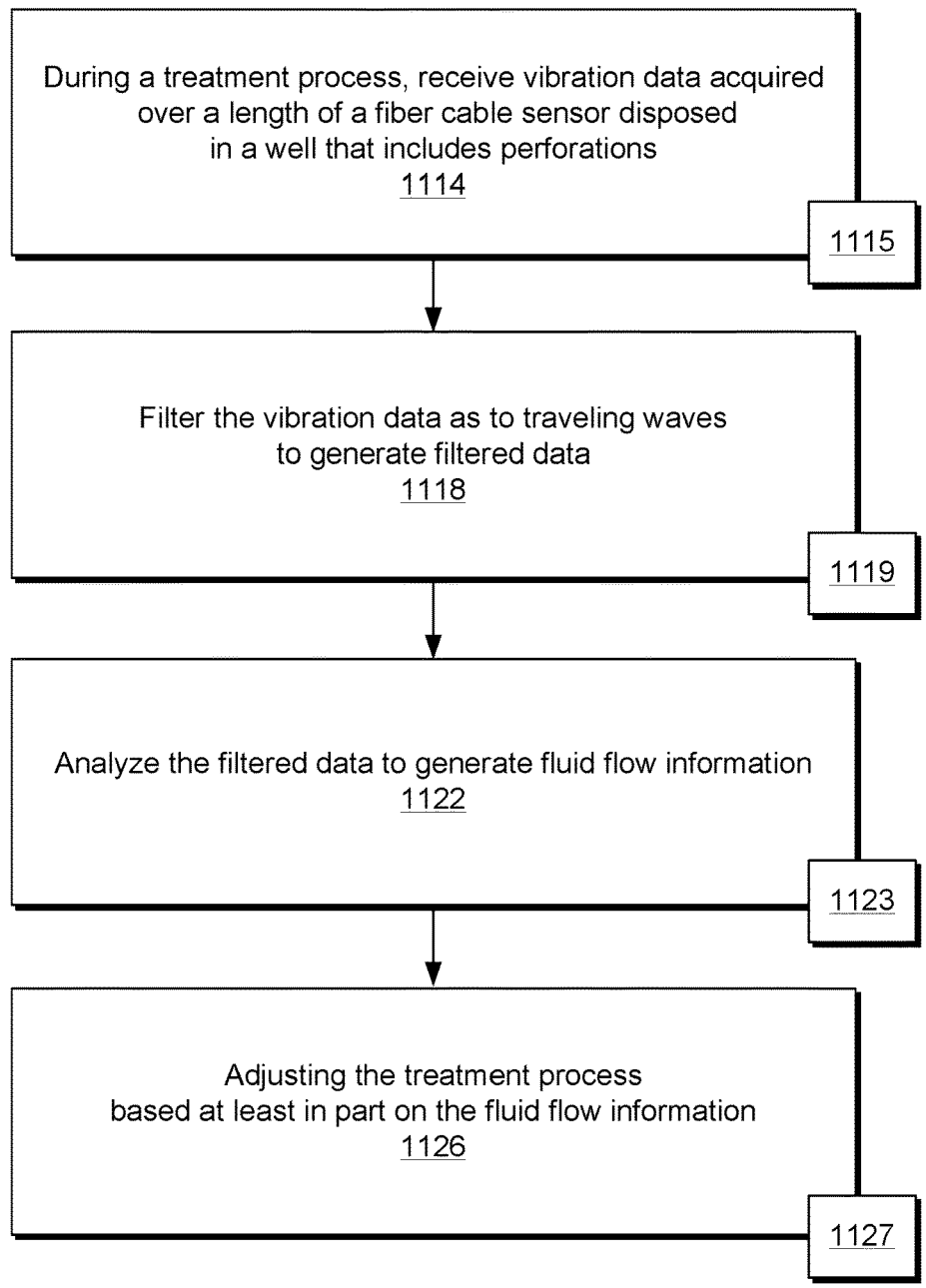
FIG. 11 illustrates an example of a method.

FIG. 11 shows an example of a method 1110 that includes a reception block 1114 for, during a treatment process, receiving vibration data acquired over a length of a fiber cable sensor disposed in a well that includes perforations; a filter block 1118 for filtering the vibration data as to traveling waves to generate filtered data; an analysis block 1122 for analyzing the filtered data to generate fluid flow information; and an adjustment block 1126 for adjusting the treatment process based at least in part on the fluid flow information.

The method 1110 may be associated with various computer-readable storage media (CRM) blocks 1115, 1119, 1123 and 1127. Such blocks may include instructions suitable for execution by one or more processors (or processor cores) to instruct a computing device or system to perform one or more actions (e.g., processor-executable instructions). As an example, a single medium may be configured with instructions to allow for, at least in part, performance of various actions of the method 1110. As an example, a computer-readable medium (CRM) may be a computer-readable storage medium that is not a carrier wave, that is not a signal and that is non-transitory.

As an example, a method may be implemented at least in part via the MISTRAL® technology (Schlumberger Limited, Houston, Tex.). As an example, a method may be part of a workflow that may be implemented as least in part via the PETREL® framework.

As an example, a method can include, during a treatment process, receiving vibration data acquired over a length of a fiber cable sensor disposed in a well that includes perforations; filtering the vibration data as to traveling waves to generate filtered data; analyzing the filtered data to generate fluid flow information; and adjusting the treatment process based at least in part on the fluid flow information. In such an example, the treatment process can include pumping fluid into the well.

As an example, perforations can include at least one set of perforations associated with a stage of a hydraulic fracturing process. For example, a set of perforations may be formed by a perforating gun that can include one or more explosive charges that upon discharge generate openings in a wall of a tube that can fluidly couple a formation adjacent to an outer surface of the tube and a flow region defined by an inner surface of the tube (e.g., a lumen of the tube).

As an example, a method can include filtering that includes transforming vibration data to an F-K domain. In such an example, filtering can include filtering vibration data in the F-K domain to generate filtered data.

As an example, a method can include adjusting a fluid flow rate and/or adjusting a fluid pressure and/or adjusting a concentration of a constituent in fluid (e.g., consider adjusting a proppant concentration and/or a chemical concentration). As an example, an adjustment or adjustments may occur in real-time during a process based at least in part on information acquired by one or more fibers.

As an example, a method can include analyzing where such analyzing includes rendering at least a portion of output information as a graphic to a display. For example, a method can include, during a treatment process, receiving vibration data acquired over a length of a fiber cable sensor disposed in a well that includes perforations; filtering the vibration data as to traveling waves to generate filtered data; analyzing the filtered data to generate fluid flow information and rendering at least a portion of the fluid flow information as a graphic to a display. In such an example, the fluid flow information can include information associated with a plurality of sets of perforations, which can correspond to a plurality of stages of a multi-stage stimulation plan. As an example, one or more metrics may be determined based at least in part on fluid flow information such as, for example, an efficacy metric as to a treatment that is a fluid delivered treatment to a portion of a formation.

As an example, a graphic generated by a computer or computing device can be or can include a waterfall plot. As an example, a graphic can include a depth axis and a time axis where fluid flow information is plotted with respect to such axes.

As an example, a method can include delivering a treatment process in phases and adjusting one of the phases, which is a current phase (e.g., a real-time adjustment to an ongoing treatment process).

As an example, a method can include delivering a treatment process in phases and adjusting one or more of the phases that are subsequent to a current phase. For example, information acquired during and/or after a phase may be utilized to adjust a subsequent phase or phases (e.g., plan, revise, etc.).

As mentioned, a method can include adjusting a treatment process or treatment processes in a real-time. In such an example, adjusting may be based at least in part on information rendered to a display in the form of a waterfall plot such as, for example, the plot 1010 of FIG. 10. As an example, a graphic rendered to a display can include information rendered with respect to a time axis (e.g., optionally vertically) and a depth axis (e.g., optionally horizontally), which may be substantially orthogonal. In such an example, stages and/or perforations may be rendered with respect to depth (e.g., measured depth) of a well such that fluid flow information can be assessed as to one or more stages and/or one or more perforations. In such an example, an assessment may determine characteristics of a formation that is in fluid communication with the well via the one or more perforations (e.g., which may correspond to one or more stages). As to a time axis, one or more processes may be presented with corresponding real-time fluid flow information, which may be presented with respect to measured depth in a well to which the one or more processes are being applied. As an example, information rendered to a display may be color and/or otherwise coded to allow for visualization and discernment as to, for example, amount of flow, flow regime (e.g., laminar, turbulent), flow rate, total cumulative flow, temperature of fluid, etc.

As an example, a system can include a processor; memory accessible by the processor; processor-executable instructions stored in the memory that include instructions to instruct the system to: during a treatment process, receive vibration data acquired over a length of a fiber cable sensor disposed in a well that includes perforations; filter the vibration data as to traveling waves to generate filtered data; analyze the filtered data to generate fluid flow information; and adjust the treatment process based at least in part on the fluid flow information. In such an example, the instructions to filter can include instructions to transform the vibration data to an F-K domain and to filter the vibration data in the F-K domain to generate the filtered data.

As an example, one or more computer-readable storage media can include computer-executable instructions to instruct a system to: during a treatment process, receive vibration data acquired over a length of a fiber cable sensor disposed in a well that includes perforations; filter the vibration data as to traveling waves to generate filtered data; analyze the filtered data to generate fluid flow information; and adjust the treatment process based at least in part on the fluid flow information. In such an example, the instructions to filter can include instructions to transform the vibration data to an F-K domain and to filter the vibration data in the F-K domain to generate the filtered data.

As an example, a system may include instructions, which may be provided to analyze data, control a process, perform a task, perform a workstep, perform a workflow, etc.

Figure 12:
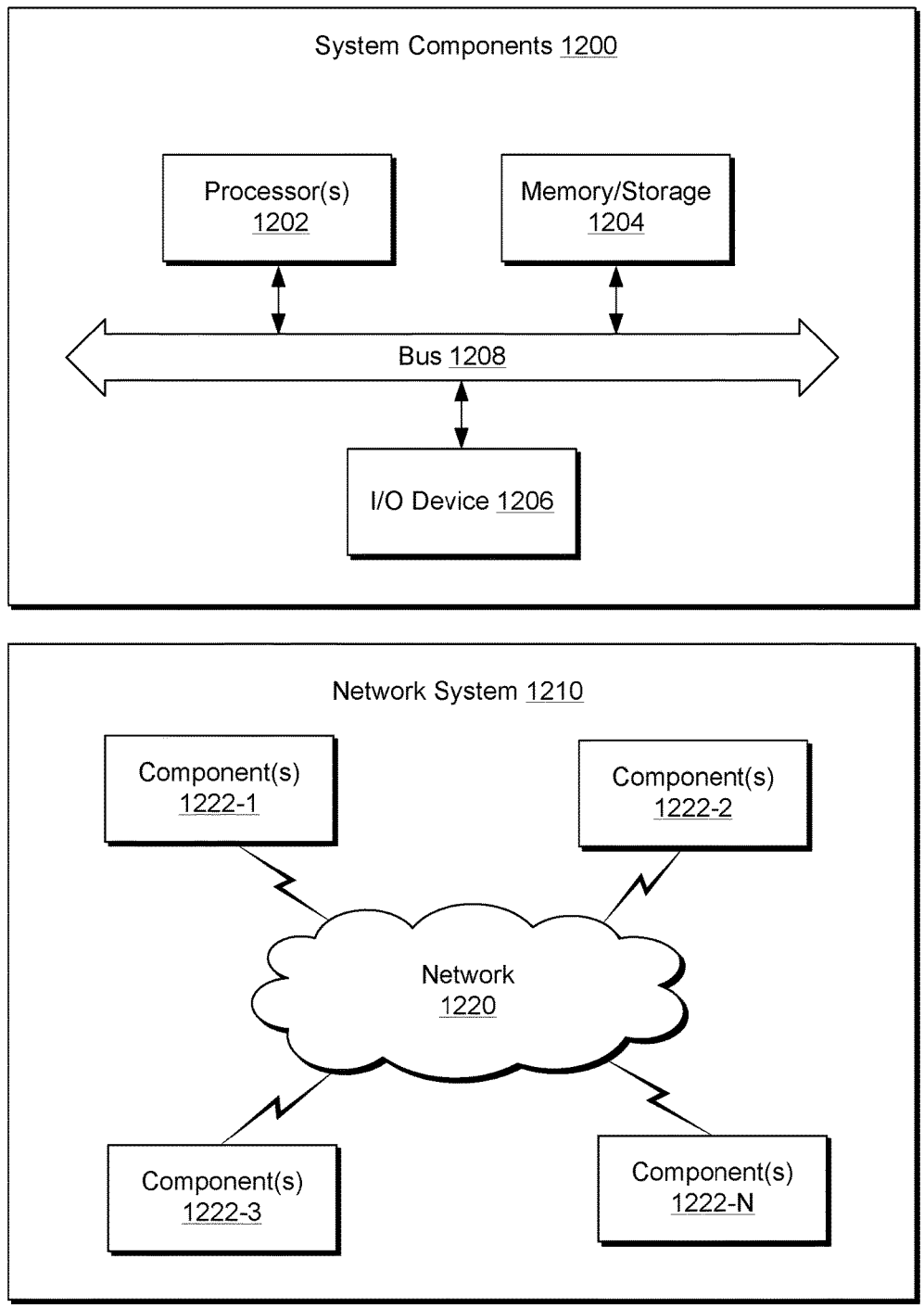
FIG. 12 illustrates example components of a system and a networked system.

FIG. 12 shows components of an example of a computing system 1200 and an example of a networked system 1210. The system 1200 includes one or more processors 1202, memory and/or storage components 1204, one or more input and/or output devices 1206 and a bus 1208. In an example embodiment, instructions may be stored in one or more computer-readable media (e.g., memory/storage components 1204). Such instructions may be read by one or more processors (e.g., the processor(s) 1202) via a communication bus (e.g., the bus 1208), which may be wired or wireless. The one or more processors may execute such instructions to implement (wholly or in part) one or more attributes (e.g., as part of a method). A user may view output from and interact with a process via an I/O device (e.g., the device 1206). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1210. The network system 1210 includes components 1222-1, 1222-2, 1222-3, . . . 1222-N. For example, the components 1222-1 may include the processor(s) 1202 while the component(s) 1222-3 may include memory accessible by the processor(s) 1202. Further, the component(s) 1222-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
   during a treatment process, receiving vibration data acquired over a length of a fiber cable sensor disposed in a well that comprises perforations;
   filtering the vibration data as to traveling waves to generate filtered data;
   analyzing the filtered data to generate fluid flow information; and
   adjusting the treatment process based at least in part on the fluid flow information.

2. The method of claim 1 wherein the treatment process comprises pumping fluid into the well.

3. The method of claim 1 wherein the perforations comprise a set of perforations associated with a stage of a hydraulic fracturing process.

4. The method of claim 1 wherein the filtering comprises transforming the vibration data to an F-K domain.

5. The method of claim 4 wherein the filtering comprises filtering the vibration data in the F-K domain to generate the filtered data.

6. The method of claim 1 wherein the adjusting comprises adjusting a fluid flow rate.

7. The method of claim 1 wherein the adjusting comprises adjusting a fluid pressure.

8. The method of claim 1 wherein the adjusting comprises adjusting a concentration of a constituent in the fluid.

9. The method of claim 8 wherein the constituent comprises proppant.

10. The method of claim 8 wherein the constituent comprises a chemical.

11. The method of claim 1 wherein the analyzing comprises rendering at least a portion of the fluid flow information as a graphic to a display.

12. The method of claim 11 wherein the graphic comprises a waterfall plot.

13. The method of claim 11 wherein the graphic comprises a depth axis and a time axis.

14. The method of claim 1 wherein the treatment process comprises phases and wherein the adjusting comprises adjusting a current phase.

15. The method of claim 1 wherein the treatment process comprises phases and wherein the adjusting comprises adjusting a subsequent phase.

16. The method of claim 1 wherein the adjusting occurs in a real-time.

17. A system comprising:
a processor;
memory accessible by the processor;
processor-executable instructions stored in the memory that comprise instructions to instruct the system to:
during a treatment process, receive vibration data acquired over a length of a fiber cable sensor disposed in a well that comprises perforations;
filter the vibration data as to traveling waves to generate filtered data;
analyze the filtered data to generate fluid flow information; and
adjust the treatment process based at least in part on the fluid flow information.

18. The system of claim 17 wherein the instructions to filter comprise instructions to transform the vibration data to an F-K domain and to filter the vibration data in the F-K domain to generate the filtered data.

19. One or more computer-readable storage media comprising computer-executable instructions to instruct a system to:
during a treatment process, receive vibration data acquired over a length of a fiber cable sensor disposed in a well that comprises perforations;
filter the vibration data as to traveling waves to generate filtered data;
analyze the filtered data to generate fluid flow information; and
adjust the treatment process based at least in part on the fluid flow information.

20. The one or more computer-readable storage media of claim 19 wherein the instructions to filter comprise instructions to transform the vibration data to an F-K domain and to filter the vibration data in the F-K domain to generate the filtered data.

* * * * *